United States Patent [19]

Watson

[11] 4,276,480
[45] Jun. 30, 1981

[54] SENSOR POSITION INDEPENDENT MATERIAL PROPERTY DETERMINATION USING RADIANT ENERGY

[75] Inventor: Robert M. Watson, Pataskala, Ohio

[73] Assignee: AccuRay Corporation, Columbus, Ohio

[21] Appl. No.: 80,112

[22] Filed: Sep. 28, 1979

[51] Int. Cl.³ .......................................... G01N 21/86
[52] U.S. Cl. .................................... 250/560; 356/381
[58] Field of Search ........... 250/216, 560, 561, 223 R, 250/234, 235, 224, 252; 356/4, 141, 152, 375, 379-387

[56] References Cited

U.S. PATENT DOCUMENTS

| | | |
|---|---|---|
| 2,819,645 | 1/1958 | Koulikovitch . |
| 2,951,161 | 8/1960 | Foster et al. . |
| 3,001,073 | 9/1961 | Alexander et al. . |
| 3,016,464 | 1/1962 | Bailey . |
| 3,187,185 | 6/1965 | Milnes . |
| 3,258,686 | 6/1966 | Selgin . |
| 3,306,103 | 2/1967 | Davis . |
| 3,348,057 | 10/1967 | Burroughs .......................... 250/215 |
| 3,532,892 | 10/1970 | Murphy .............................. 250/203 |
| 3,535,525 | 10/1970 | Minkowitz ........................... 250/208 |
| 3,557,380 | 1/1971 | Matthews ............................ 250/222 |
| 3,565,531 | 2/1971 | Kane et al. . |
| 3,588,255 | 6/1971 | Alexander . |
| 3,659,949 | 5/1972 | Walsh et al. . |
| 3,671,726 | 6/1972 | Kerr . |
| 3,741,659 | 6/1973 | Jones . |
| 3,749,500 | 7/1973 | Carlson et al. . |
| 3,771,873 | 11/1973 | Tourret ................................ 356/4 |
| 3,796,492 | 3/1974 | Cullen et al. ....................... 356/4 |
| 3,858,983 | 1/1975 | Foster et al. . |
| 3,890,840 | 6/1975 | Malloy . |
| 3,895,870 | 7/1975 | Cullen et al. ....................... 356/4 |
| 3,902,810 | 9/1975 | Hamar ................................. 250/239 |
| 3,918,816 | 11/1975 | Foster et al. ....................... 356/4 |
| 3,937,580 | 2/1976 | Kasdan ................................ 250/550 |
| 3,945,730 | 3/1976 | Simecek et al. ................... 250/571 |
| 4,039,825 | 8/1977 | Doyle ................................. 250/203 R |
| 4,053,234 | 10/1977 | McFarlane .......................... 250/561 |
| 4,054,388 | 10/1977 | Marsh et al. . |

OTHER PUBLICATIONS

"A Non-Contacting On-Line Thickness Monitor" by Biddles SIRA Review, vol. 10, No. 4, Aug. 1969.
"Remote Measurement of Distance and Thickness Using a Deflected Laser Beam" by Bodlaj et al., Appl. Op., vol. 15, No. 6, Jun. 1976, pp. 1432-1436.
"Measurement System with Position Sensing Diode Array" by Carson et al., IBM Tech. Bull. vol. 21, No. 2, Jul. 1978, pp. 741-742.
"Improved Resolution for Sensor Arrays" by Goss et al. NASA Tech. Brief Winter 1976 from JPL Inv. Rep. 30-3363.

Primary Examiner—David C. Nelms
Attorney, Agent, or Firm—C. Henry Peterson

[57] ABSTRACT

A radiant energy method and apparatus is used to determine a property such as thickness or weight per unit area of a material (14 or 40 or 170 or 238), e.g., a sheet, that is located or moving generally in a predetermined spatial relation to a first reference position (16a or 40a or 56a). A second reference position (22, 56 or 230) is defined. A sensor means (18 or 44; or 102, 112, 106 and 108; or 150, 154 and 158; or 214 and 216; or 236, 242 and 244) responds to a condition of the material. The relation of the sensor response to the material property is susceptible to change with changes in the distance relationship of the sensor means and one of the reference positions or the material. There is produced a distance response (26 or $D_2(x)$ or 110 and 110' or $\tau_1$ and $\tau'_1$ or $D_2(\tau)$ or $D_2$ or 236, 236' or 258, 258') to changes in the distance from the sensor means to one of the reference positions. The distance response is systematically related (e.g., by a computer 32 or 76 or 124 or 126 and 128) to the sensor response so as to produce a material property response (34 or $t(x)$ or $S+\Delta S$ or $S+\Delta_1S+\Delta_2S$) with substantially decreased susceptibility to change with the changes in the distance relationship.

49 Claims, 12 Drawing Figures

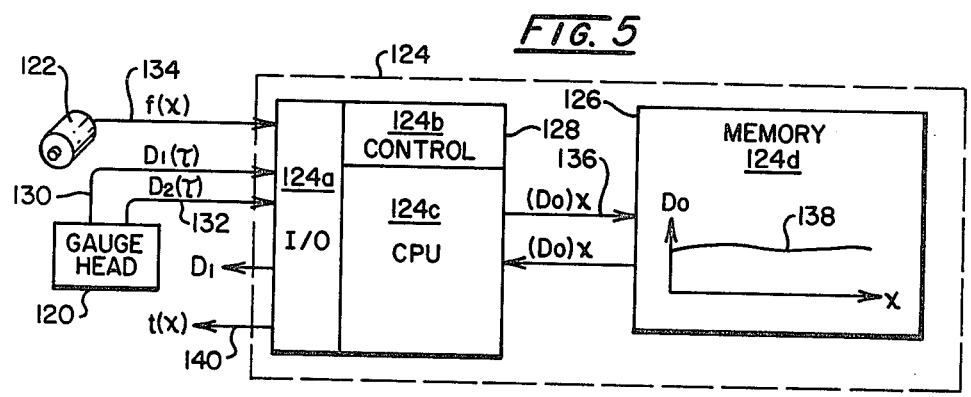
FIG. 5
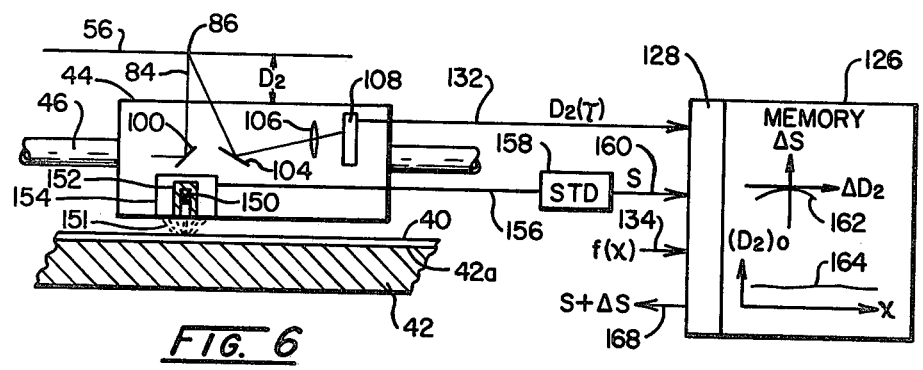
FIG. 6
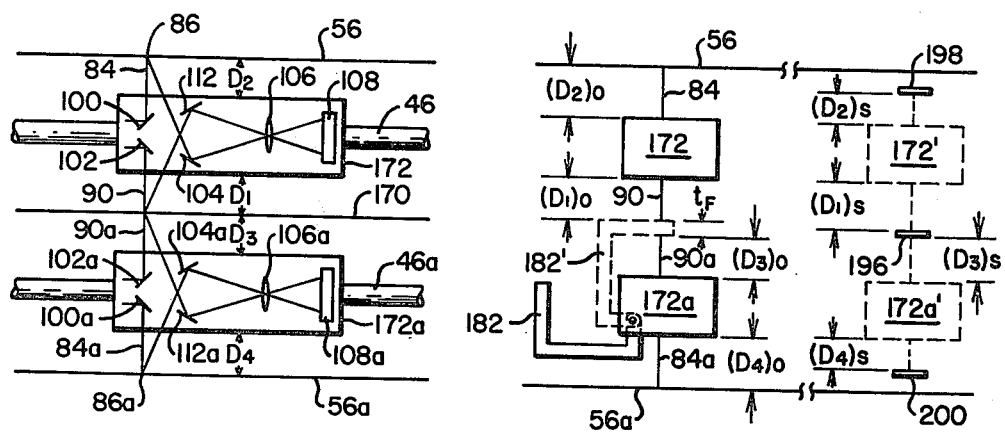
FIG. 7
FIG. 8

SENSOR POSITION INDEPENDENT MATERIAL PROPERTY DETERMINATION USING RADIANT ENERGY

TECHNICAL FIELD

This invention relates to radiant energy apparatus and methods utilizing sensor means for determining a property of a material such as that in a traveling sheet, and more particularly it relates to apparatus and methods that provide a material property response with substantially decreased susceptibility to change with changes in the distance from the sensor means to a reference position and to the material.

The invention is particularly applicable to the inspection of traveling sheets. Sheets of materials such as plastics, paper, rubber, metals, fabrics, laminates and composites are generally formed or modified in continuous processes. In order to most effectively monitor and control such a process, one or more properties of the sheet must be determined while the sheet is in motion, with one or more sensors located as close as possible to the place of sheet formation or modification.

BACKGROUND ART

In order to take into account longitudinal streaks or other profile variations, the sheet property of interest needs to be determined at a plurality of locations spaced across the width of the sheet. To this end, the sensor or sensors are commonly provided with a traversing mount that supports and guides the sensors for movement transverse to the nominal sheet path. This movement is generally along a nominal sensor path or paths established by the design of some kind of carriage and the location of some kind of track member or members on which the carriage rides.

The sheet may be constrained to move over the surface of a roll or some other surface that establishes a reference position in the region where the sheet is to be inspected. More commonly the sheet is unsupported in the inspection region and is subject to deviations from the nominal sheet path. Deviations of the sheet from a fixed plane of nominal sheet movement at the sensor location are referred to as "flutter."

The nominal sensor path is usually spaced from, and orthogonally parallel to, the nominal sheet path. However, the actual sensor path is subject to deviations from the nominal sensor path. These deviations are caused, for example, by deflections of the track members due to the shifting weight of the movable sensor and carriage, localized or general temperature variations, operation of the carriage drive mechanism, vibrations of processing machinery and the like.

The response of almost all basic sheet sensors are influenced by changes in the relative positions of the sensor and the sheet. To minimize the effect of these changes on the response of the sensor, the path of the sensor is sometimes effectively constrained to the path of the sheet, as described, for example, in U.S. Pat. No. 3,369,408, or the path of the sheet is sometimes effectively constrained to the path of the sensor means, as described, for example in U.S. Pat. No. 3,818,327.

Some of the most common types of sheet sensors utilize one or more forms of radiant energy, such as visible light, infrared, microwave, beta, gamma or X radiation. Basically the response of these sensors is influenced by changes in the distance between sensor elements such as the radiation source and the radiation detector, as well as between the source and the sheet and between the detector and the sheet.

Traversing mounts for such sensors commonly include elaborate provisions for minimizing deviations of the sensor parts from their nominal paths. As described in U.S. Pat. No. 3,668,397, for example, the sensor carriages may ride on steel tubes that are stretched under tension like a bowstring, with auxiliary supports that are occasionally or periodically realigned automatically to restore straightness. Where the contour of the nominal sheet path is normally curved across the sheet width, a matching curvature may be imparted to the nominal sensor path, as described, for example, in U.S. Pat. No. 3,191,034.

Changes in the distance between elements of a sensor means, e.g., a radiation source and a detector, or between a sensor means and a primary reference surface, e.g., a roll over which the sheet passes during measurement, are sometimes deemed unavoidable, or it may be considered uneconomical to provide the expensive structures and methods required to maintain the desired constant spatial relationships. What is sometimes done in this case is to produce a virtual or actual recording of the changes in the response of the sensor when the sheet is absent from its normal sheet path and while the sensor is moved between the limits of its normal sensor path. The recorded sensor output changes (as a function of the sensor position) are subsequently applied to the sheet property measurements obtained when the traveling sheet occupies its normal path, either as a computed correction to the penultimate measurement response or as an applied variation to a component of the measuring instrument, as described, for example, in U.S. Pat. No. 3,306,103.

These prior art "air profile" compensation techniques, however, do not take into account certain changes in conditions that prevail when the traveling sheet is present. The changed conditions may include, for example, thermal effects on the traversing mount structures due to heat-shielding of the structures by the sheet. Thermal effects can also result from the heat-exchange relationships of the structures with the traveling sheet and the boundary layer of air that may be entrained with it. The traversing mount structures can also be affected by vibrations and deformation of adjacent structures that may occur when the sheet processing machinery resumes operation.

Accordingly, many radiation source and detector arrangements have built-in flutter and deflection compensating geometric structures that allow an appreciable degree of flutter and deflection to take place with a minimal effect on the sensor response. The compensating geometric structures in combination with extremely stable traversing mounts have provided excellent results from sensor instruments utilizing radiation absorption and scattering phenomena. On the other hand, the compensating geometric structures have imposed certain constraints on the capabilities of these instruments, and much more versatile systems can be made available if these constraints can be relaxed.

Moreover, it is frequently desired to measure the thickness of sheets, either as a caliper measurement per se or as a caliper measurement in combination with the simultaneous measurement of other sheet properties. Thickness can be measured with an optical sensor that uses a well known optical triangulation method in order to respond basically to the distance from the sensor to one surface of the sheet. It is required, however, to know exactly the relative positions of the sensor and the opposite surface of the sheet. If the opposite surface of the sheet can be kept in constant contact with a fixed reference surface, and if the distance from the reference surface to the optical sensor can be kept constant, the distance measurement can be interpreted as thickness, as disclosed for example in U.S. Pat. No. 3,858,983. Where the sheet is unsupported in the measuring region, two basically identical optical distance sensors on opposite sides of the sheet can be used as described in U.S. Pat. No. 3,565,531 to derive a thickness measurement from two distance measurements.

The apparatus of the latter patent utilizes fixed structures on the two sides of the sheet, and measures thickness at only a single point across the width of the sheet. If it is desired to measure at several points across the sheet width, a multiplicity of distance sensors may be used, and several sensors may share the use of a single laser beam source of radiation, as disclosed in U.S. Pat. No. 3,671,726. However, for certain important measurements and analyses, such as resolving the variation components of the measured sheet property in both the machine direction and the cross direction, for example, as described in U.S. Pat. Nos. 3,552,203 and 3,612,839, it appears that the number of such sensors required would become both impractical and prohibitively expensive. On the other hand, proposals as in U.S. Pat. No. 3,858,983 supra for the use of a single optical distance or thickness sensor arrangement on a traversing gauge mount have not taken into account the ubiquitous and quite serious problems caused by the position instability of the mechanical sensor support and guidance systems.

DISCLOSURE OF INVENTION

In accordance with this invention, there are provided radiant energy methods and apparatus for determining a property of a material that is normally inspected while located generally in a predetermined spatial relation to a first reference position, comprising the method steps and means for defining a second reference position, utilizing a sensor means to respond to a condition of the material and to produce a sensor response that can be related to the material property, the relation of the sensor response to the property being susceptible to change with changes in the distance relationship of the sensor means and one of the reference positions or the material, producing a distance response to changes in the distance from the sensor means to at least one of the reference positions, producing an initial sensor and distance response-related value or values that can be derived by utilizing the first and second reference positions, and responding to the distance response, the initial value or values, and the sensor response so as to produce a material property response with substantially decreased susceptibility to change with the changes in the distance relationship of the sensor means and the reference position or the material.

The material is typically in the form of a sheet that travels generally along a nominal sheet path, and method steps and means may be provided for supporting and guiding the sensor means generally along at least one nominal sensor path transverse to the sheet path so as to permit sensing the sheet condition at a plurality of locations spaced across the width of the sheet, the actual path or paths of the sensor means being subject to deviations from the nominal path that may result in changes in the distance from the sensor means to the one reference position or the material. The second reference position may be defined as a reference path that is relatively independent of at least one factor that tends to produce a deviation of the actual path or paths of the sensor means.

Method steps and means may be provided for producing a stored record derived from the sensor response and the distance response when the material is absent from its normal inspection location, and responding to the stored record to produce the initial sensor and distance response-related value.

Method steps and means may also be provided for responding to the location of the sensor means along its path across the width of the sheet and relating the values in the stored record to the sensor means location, and responding to the sensor location-related stored-record values to produce the initial sensor and distance response-related value, whereby the material property response is produced in response to initial values, and sensor and distance response values, from corresponding locations across the width of the sheet.

The sensor response may comprise a response to the distance from the sensor means to one surface of the material, and the material property response may comprise a response to the thickness of the material.

The sensor response may be an uncorrected response that can be related to the material property, but in a manner which is subject to error due to changes in the distance from the sensor means to the one reference position or the material, and the uncorrected response may be systematically related to the distance response so as to produce a substantially corrected material property response.

A first distance sensor may be supported and guided along a first nominal sensor path on one side of the nominal sheet path to produce a first sensor response to the distance from the first distance sensor to the surface of the sheet on the one side thereof, and a second distance sensor may be supported and guided along a second nominal sensor path on the other side of the sheet path to produce a second sensor response to the distance from the second distance sensor to the surface of the sheet on the other side thereof. The first reference position may be defined on one side of the nominal sheet path as a reference path that is relatively independent of at least one factor that tends to produce a deviation of the actual path of one of the distance sensors. The second reference position may be defined on the other side of the nominal sheet path. Method steps and means may be provided for producing a first distance response to the distance from the first distance sensor to the first reference position, producing a second distance response to the distance from the second distance sensor to the second reference position, and responding to the initial value or values, the first and second sensor responses and the first and second distance responses to produce a response to the thickness of the sheet.

The sensor means may produce an uncorrected response that can be related to the material property but which is subject to error due to changes in the distance from the first, the second, or both sensor means from either or both of the first and second reference positions or the material. There may be provided a method step and means for responding to the initial value, the uncorrected sensor response and the first and second distance responses to produce a corrected sensor response to the material property.

The first sensor means may comprise a radiation source, and the second sensor means may comprise a radiation detector for detecting radiation from the source that is transmitted through the sheet.

The initial sensor and distance response-related values may be produced by method steps or means for, in the absence of the sheet material in the normal inspection location, supporting a test fixture in the region of the nominal sheet path to produce a sensor response to the test fixture, producing a stored record derived from the sensor means response to the test fixture and the first and second distance responses at a plurality of locations along the path of the sensor means, responding to the location of the sensor means along its path across the width of the normal inspection location of the sheet material and relating the values in the stored record to the sensor means location, and responding to the sensor location-related stored-record values to produce the initial sensor and distance response-related values, whereby the material property response is produced in response to initial values, and sensor and distance response values, from corresponding locations across the width of the sheet.

Both the sensor response and the distance response may be derived from a common radiation sensor array, and the distance response may be directed so that it compensates the sensor response for the changes in the distance relationship. Method steps and means may be provided for producing an illuminated spot on one surface of the material, producing an illuminated spot at one of the reference positions, optically projecting images of the illuminated spots onto the common sensor array in a manner such that the changes in the distance relationship produce substantially equal movements of both images in the same direction, and responding to the distance between the images to produce a compensated sensor response.

The distance response may be produced by shifting the axis of the light beam that produces the illuminated spot on the material.

In accordance with another aspect of the invention, there is provided a radiant energy method and apparatus for determining a property of a sheet material that is normally inspected while traveling generally along a nominal sheet path, comprising the method steps and means for utilizing a sensor means to respond to a condition of the sheet material and to produce a sensor response that can be related to the material property, the relation of the sensor response to the property being susceptible to change with changes in the distance relationship of the sensor means and the sheet material, supporting and guiding the sensor means generally along at least one nominal sensor path transverse to the sheet path so as to permit sensing the sheet condition at a plurality of locations spaced across the width of the sheet, the actual path or paths of the sensor means being subject to deviations from the nominal path that may result in changes in the distance from the sensor means to the sheet material and thereby adversely influence the sensor response, defining a reference path that is relatively independent of at least one factor that tends to produce a deviation of the actual path or paths of the sensor means, producing a distance response to changes in the distance from the sensor means to the reference path, and systematically relating the sensor response to the distance response so as to produce a sheet property response with substantially decreased susceptibility to change with the changes in the distance relationship of the sensor means and the material.

The sensor means response may be an uncorrected response that can be related to the property of the sheet material but which is subject to error due to the sensor path deviations, and the uncorrected response may be systematically related to the distance response so as to produce a substantially corrected material property response.

The distance response may be produced by responding to the distance from the sensor means to the reference path and the distance from the sensor means to one side of the sheet.

The sheet may travel generally along a nominal sheet path but the actual path of the sheet may be subject to deviations from the nominal sheet path so that the sensor means response is influenced by the individual or combined effects of the sensor path and sheet path deviations. The sensor means response may be an uncorrected response that can be related to the sheet property but is subject to error due to the influence of the sensor path and sheet path deviations, and the uncorrected response may be systematically related to the distance response so as to produce a substantially corrected material property response.

The other side of the sheet may be effectively constrained to a fixed primary reference path; the distance response may constitute a substantially corrected sensor means response, and the corrected sensor means response may be indicative of the thickness of the sheet.

Method steps and means may be provided for defining a second reference path, responding to the distance from the sensor means to the second reference path and the distance from the sensor means to the other side of the sheet, to produce a second distance response, and systematically relating the second distance response to the sensor means response to produce the sheet property response.

The first and second distance responses may constitute a substantially corrected sensor response, and the corrected sensor means response may be indicative of the thickness of the sheet.

The sensor means response may be an uncorrected response that can be related to the sheet property, but which is subject to error due to the sensor path and sheet path deviations, and the uncorrected response may be systematically related to the first and second distance responses so as to produce a substantially corrected sheet property response.

The means for defining the second reference position may comprise a mechanical member. The mechanical member may extend transversely across the width of the path of a traveling sheet to define a reference path that can be related to the path of the sensor when measuring the property of the material constituting the sheet. The mechanical member may comprise a tape.

The means for defining the second reference position may comprise a laser beam.

The objects of this invention are to provide improved radiant energy methods and means for determining material properties utilizing sensors whose responses are related to the material properties in ways that are susceptible to change with changes in the distance relationships of the sensors and the materials or reference positions; to provide such methods and means for producing material property responses having substantially decreased susceptibility to change with the changes in the distance relationships; to provide such methods and means that permit the use of less precise and less expensive sensor support structures, to provide such methods and means that reduce the requirements for geometric distance compensation structures associated with the sensors; to provide such methods and means that can make available more versatile radiant energy sensors by allowing the removal of certain constraints imposed by the geometric distance compensating structures; to provide such methods and means, particularly for sensing the properties of materials in the form a sheet traveling along a nominal sheet path, utilizing a sensor means that is supported and guided along a nominal sensor path transverse to the sheet path, whereby the material property response can be substantially corrected for errors caused by deviations of either or both the sheet and the sensor means from their respective nominal paths; to provide such methods and means that can allow completely non-contacting measurements to be made where previously some contact with the material was usually necessary; and to provide such methods and apparatus that can permit accurate optical caliper or other caliper measurements to be made even though the mechanical sensor support structure is subject to displacements from a reference position and even when the reference position is not available as a reference for the sensor.

Other objects and advantages will become apparent in the following detailed description, taken in conjunction with the appended drawings, in which:

BRIEF DESCRIPTION OF THE DRAWINGS

FIG. 5 is a diagrammatic sketch illustrating a typical data processing scheme that can be used in combination with the apparatus of FIG. 3 and FIG. 4 to produce a sheet caliper response.

FIG. 6 is a diagrammatic sketch representing a beta ray backscatter sensor and an optical distance indicating instrument together with a typical data processing scheme for producing a sheet mass per unit area response.

FIG. 7 is a diagrammatic sketch showing a modification of a portion of FIG. 3 and incorporating a pair of optical systems as in FIG. 4, that can be used typically for measuring the caliper or thickness of an unsupported, traveling sheet.

FIG. 8 is a diagrammatic sketch providing another representation of the apparatus of FIG. 7, that is useful in combination with FIG. 9 for explaining the initial set-up and standardization of the apparatus.

BEST MODES FOR CARRYING OUT THE INVENTION

Figure 1:
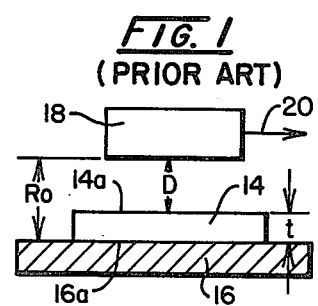
FIG. 1 is a diagrammatic sketch representing one typical class of prior art caliper or thickness gauging instruments that can be improved by the methods and apparatus of the present invention.

Referring to FIG. 1, a material 14 is located on top of a support 16. A sensor 18 responds to a condition of the material 14 to produce a sensor response, e.g., a signal response on a line 20, that can be related to a property of the material 14.

Typically the material property to be determined is the caliper, or thickness dimension t of material 14. The sensor 18 in this case is typically a distance sensor that responds to the elevated condition of the top surface 14a of the material to produce a response on line 20 indicative of the distance D from the sensor 18 to the surface 14a.

The sensor response on line 20, indicative of the distance D, can be related to the thickness property t by a procedure that includes establishing a reference position, here illustrated as corresponding to the top surface 16a of the support 16, and locating the material 14 precisely in a predetermined spatial relation to the reference position. As illustrated, the material 14 is located with its bottom surface in contact with the top surface 16a of the support 16. The reference position at 16a is located at a known, fixed distance $R_o$ from the sensor 18 (or sensor 18 is located at a distance $R_o$ from the reference position at 16a). Hence the sensor response (indicative of the distance D) can be related to the material thickness property t in accordance with $$t = R_o - D \qquad (1)$$

This relation of the sensor response to the thickness property is susceptible to change with changes in the distance relationship of the sensor 18 and the reference position at 16a or the bottom surface of the material 14. If the distance $R_o$ changes to $R_1$, for example, the sensor response becomes related to the thickness property in accordance with $t = R_1 - D$. If the material 14 can be removed from between the support 16 and the distance sensor 18, the sensor itself can be used to detect the fact that the distance $R_o$ has changed to $R_1$, and appropriate standardization adjustments can be made to change the relation used to convert subsequent distance measurements to the desired correct thickness property values. However, when the material 14 is the product of a continuous process, the sensor 18 cannot "see" the reference position at surface 16a between measurements, and thus cannot distinguish between a change in the distance $R_o$ and a change in the thickness t of the material 14.

Figure 2:
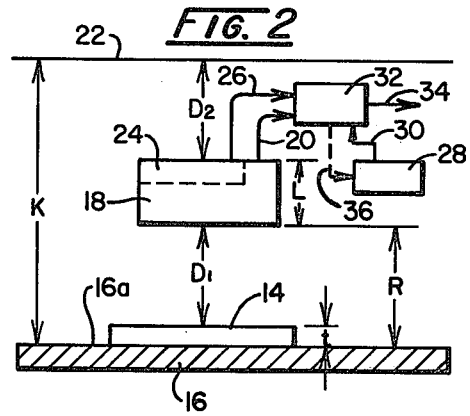
FIG. 2 is a diagrammatic sketch showing one typical way in which the apparatus of FIG. 1 can be modified according to the invention.

In accordance with this invention, the prior art method and apparatus depicted in FIG. 1 is modified, in one arrangement, to that depicted in FIG. 2. Here a second reference position 22 is defined at a nominally fixed distance K from the first reference position at the top surface 16a of support 16. In FIG. 2, a sensor 18 provides a measure of the distance $D_1$, corresponding to the distance D in FIG. 1, and additionally a means depicted at 24 (in the same box with sensor 18) produces a distance response, e.g., by producing a signal on a line 26, to changes in the distance $D_2$ from the sensor 18 to the reference position 22. As shown, $$K = D_1 + D_2 + L + t \quad (2)$$

where L is the "size" of the sensor 18. The thickness t of the material 14 can be determined from $$t = (K - L) - D_1 - D_2 \quad (3)$$

The quality K−L is nominally a constant, since it is presumed that the probe size L does not change. The value of this constant can be determined when the material 14 is absent, that is, when t=o, from $$K - L = (D_1)_o + (D_2)_o = (D_1 + D_2)_o \quad (4)$$

where $(D_1)_o$ and $(D_2)_o$ are the values for the distances $D_1$ and $D_2$ when the thickness of material 14 is zero, and $(D_1+D_2)_o$ is the sum of $(D_1)_o$ and $(D_2)_o$.

Since the values for $D_1$ and $D_2$ are respectively indicated by the sensor response on line 20 and the distance response on line 26, $(D_1)_o$ and $(D_2)_o$ respectively are initial sensor and distance response-related values that can be derived by utilizing the first and second reference positions at 16a and 22.

When the material is present, its thickness property or caliper can be determined from $$t = (D_1 + D_2)_o - (D_1 + D_2) = D_o - (D_1 + D_2) \quad (5)$$

where $D_o = (D_1 + D_2)_o$. The value $D_o$ is an initial sensor and distance response-related value that is expressed as a single number, rather than two separate numbers, and is conveniently used since values for $D_1$ and $D_2$ do not need to be obtained separately in order to determine the material thickness per se. Moreover, as will be explained hereinafter, the sum of the values $D_1+D_2$, or the value $D_o$ can effectively be obtained directly from a single detector.

In the general embodiment of FIG. 2, the initial sensor and distance response-related value, e.g., $D_o$, or values, e.g., $(D_1)_o$ and $(D_2)_o$, are produced by a means 28 that may, as illustrated in the drawing, provide a signal or signals on a line 30. A means 32 responds to the distance response as on line 26, the initial value or values as on line 30, and the sensor response as on line 20 to produce a material property (e.g. thickness) response, as by providing a signal on a line 34.

Typically means 32 may comprise a digital or analog computer device that computes a value for the material property, such as by computing the thickness or caliper t in accordance with equation (5) above. It is apparent from inspection of FIG. 2 and this equation that whereas the relation of the sensor response 20 (indicative of $D_1$) to the thickness t is susceptible to change with changes in the distance R from the sensor 18 to the reference position 16a, or the bottom surface of the material 14, the computed response, as on line 34, has a substantially reduced susceptibility to such change.

In fact, if there is no movement of support 16 and its top surface 16a relative to the second reference position defining means 22 or vice versa, and if the measurements and computations are free from error, the material thickness property response will not be affected at all by movement of the sensor 18 toward or away from the reference position 16a (or the reference position 22). For example, if the distance R increases, the distance $D_1$ increases by an equal amount, but at the same time the distance $D_2$ decreases by the same amount so that the sum $(D_1+D_2)$ and the computed thickness t remain the same.

The initial sensor and distance response-related value $D_o$ or values $(D_1)_o$ and $(D_2)_o$ can be expected to remain substantially constant for long periods of time, since the first and second reference positions can be defined by very stable structures. If there is a long term change in $D_o$, for example, a new and correct $D_o$ value can be derived by computer device 32 in response to the $D_1$ and $D_2$ responses as on lines 20 and 26 when the material 14 is absent from its normal inspection location on the support 16. The computer device 32 can then produce a stored record in an associated memory or data storage device, here illustrated as the means 28, by transferring the new $D_o$ value to an appropriate memory location via a signal line or lines 36. Then, when a material 14 to be measured is placed in the measuring location on support 16, the computer device 32 can respond to the stored record in order to produce the correct initial sensor and distance response-related value or values.

While the functions described for the means 28 and 32 in FIG. 2 may be preferably performed by a conventional stored-program, general-purpose or process-control type of electronic digital computer, if appropriate the simple computation and data storage functions required can be performed by various other means, say, by any desired, suitable type of digital data processing device, using a microprocessor, for example. Likewise, if desired any suitable type of analog computer can be employed, for example, one using automatic servo-rebalancing potentiometers for recording or data storage as in U.S. Pat. No. 2,951,161 or one using sample and hold circuits for recording or data storage as in U.S. Pat. No. 4,085,326.

While the most practical way to produce initial sensor and distance response-related values is to derive them by the use of the sensor 18 and the distance response-producing means 24, it can be seen from equation (4) that the distance K in FIG. 2 is in fact an initial sensor and distance response-related value that could be used and could be produced by other means, for example, by some kind of direct measurement. Other forms of initial sensor and distance response-related values, and methods for producing them, are no doubt possible and will occur to those skilled in the art.

Figure 3:
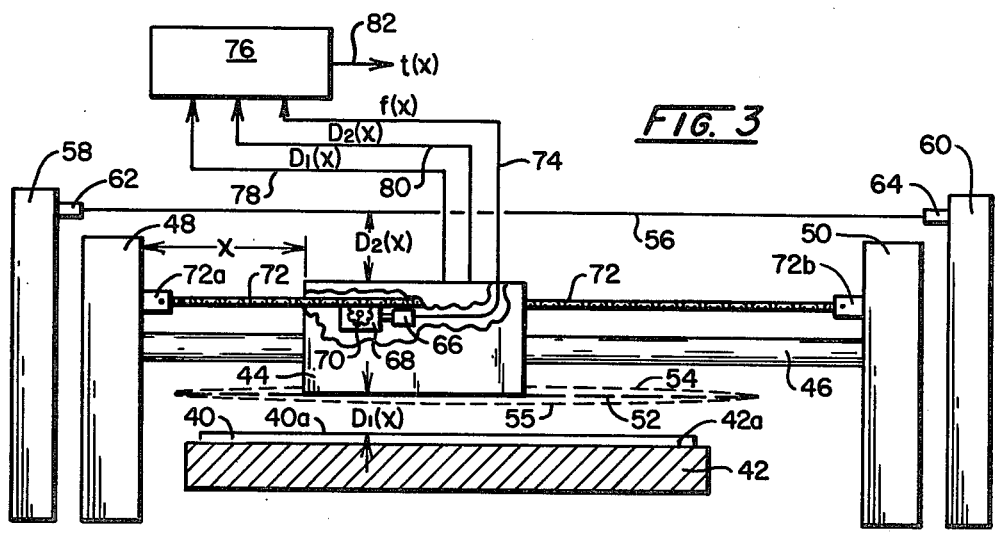
FIG. 3 is a diagrammatic side elevation of a representative mechanical structure illustrating typical features of a sheet gauging apparatus according to the invention.

FIG. 3 illustrates one application of the invention to the measurement of a material in the form of a sheet 40. Sheet 40 is shown here as a section across the width of a continuous length of sheet material that is moving out of the paper toward the viewer. The sheet 40 is traveling generally along a nominal sheet path (that coincides with the sheet 40 as shown) immediately above a support 42 that may represent a support plate under the sheet or a roll over which the sheet passes at the inspection location. The sheet 40 normally remains in contact with the support 42 at all times, so that the sheet path is in a nominally fixed position at the inspection location.

A box 44 represents a sensor means or gauging head that is mounted so as to permit movement of the sensor means along the length of a pair of guide tubes as at 46. The guide tubes are attached to a pair of end frames 48 and 50 that in turn may be secured to the floor of the manufacturing facility or otherwise anchored in place. The guide tubes 46 support and guide the sensor means 44 generally along at least one nominal sensor path, here represented by a dashed line 52, that is transverse to the nominal sheet path so as to permit sensing the sheet condition at a plurality of locations spaced across the width of the sheet 40.

However, the actual path of the sensor means is subject to deviations from the nominal path 52. These deviations may be such that the actual sensor path at times deviates upwardly, as shown by the dotted line 54, or downwardly as shown by the dotted line 55. Such deviations result in changes in the distance relationship of the sensor means 44 and the one reference position defined by the top surface 42a of support 42 or the bottom surface of the material 40.

A second reference position is defined as a reference path 56 that is relatively independent of at least one factor that tends to produce a deviation, as at 54 or 55, of the actual path 52 of the sensor means 44. Typically the reference path 56 is defined by the position of a filament or tape stretched between a pair of base supports 58 and 60 and secured thereto by hangers 62 and 64. One of the hangers may include a suitable tensioning device adapted to maintain the tape or filament under a constant tension so that the amount of sag in the tape will be substantially constant. Typically the tape is made of high-quality steel with a suitably finished surface and a suitable width, so as to provide the target for a laser beam on the order of 0.01 inches (0.25 millimeters) in diameter.

The tape reference path 56 provides a reference position that is substantially independent of factors such as the shifting weight of the sensor means 44 and its appurtenances, and operation of the sensor carriage drive mechanism (not shown), that tend to produce deviations of the actual path of the sensor means. It can also be relatively independent of other factors such as certain kinds of temperature effects or certain types of vibrations that affect the sensor path 52.

The embodiment of the invention shown in FIG. 3 includes a conventional gauging head location transducer to provide a response or signal indicative of the current location of the sensor 44 within its allowed range of movement across the width of the sheet 40. The current sensor location can be expressed in terms of the distance x, as shown, of the sensor 44 from one of the end frames 48. As shown, the gauging head location transducer comprises a multiturn, helically-wound potentiometer 66 whose movable contact (not shown) is driven through a gear box 68 and sprocket 70 arrangement. The sprocket 70 engages a stationary drive chain 72 that is secured at its ends 72a and 72b to the end frames 48 and 50, so that movement of the sensor 44 along the length of the guide tubes 46 produces rotation of the sprocket 70 and movement of the contact of potentiometer 66. Potentiometer 66 thus provides a voltage signal on a line 74 that is a function f(x) of the distance x from the current sensor 44 location to the end frame 48 (or other selected point).

Hence each measurement of the distance $D_1$ and the accompanying measurement of the distance $D_2$ is associated with a distance x that identifies the location, along the sensor path across the width of the sheet, where the measurements are taken. Equation (5) can now be rewritten as a profile equation $$t(x) = D_0(x) = (D_1(x) + D_2(x)) \qquad (6)$$

that can be solved by a computer device 76. Device 76 receives the signal f(x) from potentiometer 66 via line 74 as well as signals $D_1(x)$ and $D_2(x)$ on lines 78 and 80 respectively, and produces a response t(x), as by signals on a line 82, indicative of either one or more individual thickness measurements at a selected point or points across the sheet width, or a complete readout of the entire thickness profile across the full width of the sheet.

Whereas the sensor response that is a function of $D_1(x)$ is an uncorrected response that can be related to the sheet property t(x) but in a manner which is subject to error due to changes in the distance relationship of the sensor means 44 and the reference position 42a or the bottom surface of the material 40, the uncorrected response is systematically related, by implementation of equation (6) in computer 76, to the distance response that is a function of $D_2(x)$ so as to produce a substantially corrected sheet property response t(x).

Figure 4:
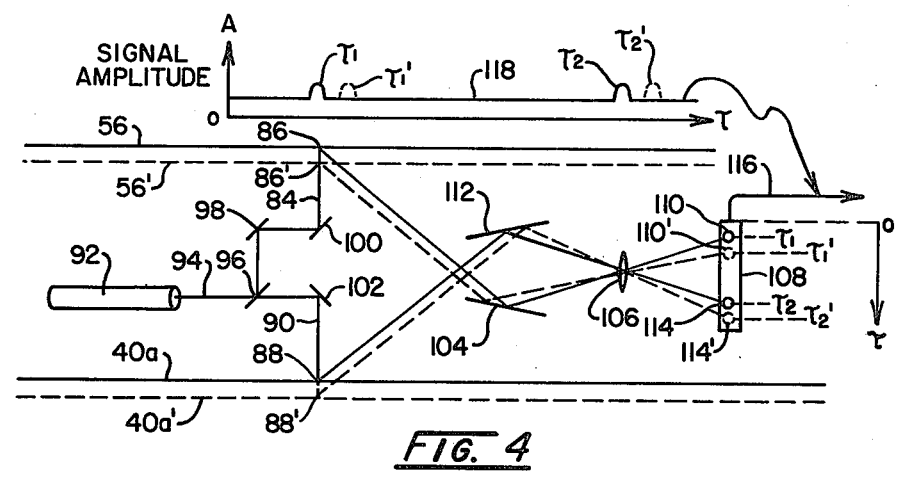
FIG. 4 is a diagrammatic sketch showing the principles of one typical form of optical system that may be incorporated into the apparatus of FIG. 2 or FIG. 3, with an associated sketch of a typical electrical signal waveform that can be obtained from a detector that is combined with the optical system.

One typical embodiment of this invention includes an optical geometric arrangement represented in FIG. 4 that produces both a sensor response $D_1(x)$ and a distance response $D_2(x)$ from a single detector. As shown, a light beam 84 is directed onto the surface of the tape that defines the second reference path 56, forming a small, intense spot of light at a point 86 on the tape surface. A similar spot of light 88 is formed on the top surface 40a of the material 40 by a second light beam 90. As shown, a laser 92 produces a coherent light beam 94 that is split by a beam splitter 96 so that about half of the light is reflected by the beam splitter 96 and mirrors 98 and 100 to form beam 84. The other half of the light passes through beam splitter 96 and is reflected by a mirror 102 so as to form the light beam 90. It is not essential that the light beams 84 and 90 be coherent, or derived from a laser, but the beams should be very small, bright, well defined and made up of very nearly parallel rays.

A mirror 104, a lens system 106 and a detector 108 are positioned so that light diffusely reflected from the illuminated spot 86 (on the tape defining reference path 56) will illuminate a corresponding spot 110 on detector 108. Similary a mirror 112 is so positioned with respect to lens system 106 and detector 108 that light diffusely reflected from the illuminated spot 88 (on the top surface 40a of sheet 40) will illuminate a corresponding spot 114 on detector 108. While lens system 106 is illustrated as a simple double-convex lens, and will hereinafter be referred to simply as a "lens", it is understood that an appropriate lens system will be used.

Detector 108 is typically a monolithic self-scanning linear photodiode array of the type that is marketed by Reticon Corporation, of Mountain View, Calif. The array may comprise say, 128, 256, 512 or 1024 silicon photodiodes arranged in a single straight line and spaced apart on 1-mil (25.4 micron) centers.

In an equivalent circuit (not shown) for this detector, each photodiode is connected in parallel with an individial storage capacitor, to form a "cell" that is connected to one side of a low-voltage D.C. power supply. An individual transistor switch connects each photodiode-and-capacitor "cell" to a video output line. The transistor switches are turned on and off in sequence by a shift register arrangement driven by clock pulses. When a particular cell is effectively connected to the video output line, the storage capacitor is charged to the voltage of the power supply. The switch is then caused to effectively disconnect the cell from the video output line. The other switches are similarly operated to charge all the other cells in turn as the shift register arrangement proceeds through its complete scanning cycle during a "line-scan time".

During most of the line-scan time, the charge on the particular cell storage capacitor is being partially removed due to the reverse current (photocurrent) flowing through the associated photodiode. The amount of charge removed is the product of the line-scan time and the average photocurrent, which depends on the average intensity of the light falling on the photodiode during the line-scan time. When the particular cell is again connected to the video line, the charge on the cell capacitor is restored as the voltage across the capacitor is restored to the original value of the power supply voltage. The signal appearing on the video line at this time is indicative of the amplitude of the charging current pulse, and hence indicative of the light intensity on the particular photodiode.

As seen in FIG. 4, the detector 108 comprises a vertical line of photodiodes (not shown) that are scanned periodically from top to bottom in the direction of the arrow $o-\tau$. Here $\tau$ represents time within a given line-scan time cycle. The photodiodes illuminated by the spot 110 are scanned (the charges on their associated storage capacitors are restored) at time $\tau_1$. The photodiodes illuminated by the spot 114 are scanned at $\tau_2$.

The video output line of detector 108 is represented by line 116 of the drawing, and an illustrative waveform for the signal on line 116 is represented at 118 on the accompanying graph of signal amplitude versus time $\tau$. Any given instant of time $\tau$, and/or the particular photodiode in the array of detector 108 being scanned at that instant, can be identified, inter alia, by counting the number of clock pulses fed to the shift register (not shown) that gates the detector array, after the start of the scan at $\tau=0$.

It is apparent from the angular relationships shown that the time $\tau_1$ is indicative of the distance $D_2$ of FIG. 2 or FIG. 3. If the reference position 56 defined by the tape is moved to position 56', for example, relative to the optical system, the light beam will form a spot on the tape surface at point 86' instead of point 86. The optical system will produce a distance response to this change in the distance $D_2$ by moving the illuminated spot 110 to a new position 110'. The photodiodes illuminated at position 110' will be scanned at a later time $\tau_1'$ in the scanning cycle, and the detector system will in its turn produce an electrical distance response to the change in distance $D_2$ by producing a pulse $\tau_1'$ at a later time in the signal waveform shown at 118. Since the times $\tau_1$ and $\tau_1'$ are rather precisely related to distances along the length of the detector array 108, the system is calibrated and the values of $D_2$ are computed by conventional techniques of optical triangulation. (See the Appendix).

Similarly it is apparent that the time $\tau_2$ is indicative of the distance $D_1$ of FIG. 2 or FIG. 3, and the portion of the system comprising mirrors 102 and 112, lens 106 and detector 108 constitutes a distance or thickness sensor. If the top surface 40a of the material 40 (FIG. 3) assumes a depressed condition as shown at 40a' in FIG. 4, the light spot 88 will move to a new position at 88'. The optical system will then produce an optical sensor response by moving the light spot 114 to a new position 114'.

The illuminated photodiodes at the new position 114' will be scanned at a later time $\tau_2'$, and hence the detector 108 will produce an electrical sensor response in the form of a corresponding pulse $\tau_2'$ on the video output line 116. The pulse will appear at a later time in the scanning waveform 118. Since the times $\tau_2$ and $\tau_2'$ are rather precisely related to distances along the length of detector array 108, the system is calibrated, and values of $D_1$ are computed, by the known optical triangulation methods. The thickness property t of the material can then be computed, from equation (5) for example.

Apparatus such as that represented by FIG. 4 can not only provide separate indications of both distance $D_1$ and $D_2$ from a single detector array; it can also provide an indication of the sum of the distances $(D_1+D_2)$ or $D_o$ and hence provide a single response value that is substantially self-compensated for changes in the distance from the sensor to one of the reference positions. In this case the optical system, mounted in sensor box 44 of FIG. 3, for example, should be symmetrically constructed as exemplified by FIG. 4 and centered between the reference path 56 and the nominal path for the top surface 40a of the sheet 40.

To illustrate this self-compensating aspect, let it be assumed that the second reference surface and the material top surface occupy fixed positions as shown respectively by the solid lines 56 and 40a in FIG. 4. Also it is assumed that the sensor box 44 in FIG. 3 is located along the nominal sensor path 52, and that the sum of the distances $D_1$ and $D_2$ is indicated in FIG. 4 by the distance between the illuminated spots 110 and 114 on the detector 108 or by the time difference $(\rho_2-\tau_1)$ between the pulses occurring at $\tau_1$ and $\tau_2$ on waveform 118.

Now suppose that the path of the sensor box 44 moves upwardly so that instead of being located along the nominal sensor path 52 the sensor box 44 is located along an actual path 54 that deviates from the nominal path. With all other factors remaining the same, this increases the distance $D_1$ and decreases the distance $D_2$ by an equal amount, so that the sum $(D_1+D_2)$ of the distances remains the same.

From the viewpoint of the optical sheet sensor portion 102, 112, 106 and 108 of FIG. 4 apparatus, it will now appear that the sheet top surface has moved, downwardly, say, to the position shown at 40a', because the spot formed on the sheet surface by laser beam 90 will now appear at point 88' instead of at point 88. From the viewpoint of the optical distance response-producing portion 100, 104, 106 and 108 it will appear that the reference surface has moved downwardly by about the same amount, say, to the position shown at 56', because the spot formed on the reference surface by laser beam 84 will now appear at point 86' instead of at point 86. The sheet sensor portion of the optical system will produce a sensor response by moving the illuminated spot 114 on the detector downwardly to the new position 114' and the distance portion will produce a distance response by moving the illuminated spot 110 downwardly about the same amount to the new position 110'. When the photodiodes are scanned, the pulse on the video output line 116 that previously occurred at $\tau_1$ will now appear at a later time $\tau_1'$, and the pulse that previously occurred at time $\tau_2$ will now occur at a later time $\tau_2'$. The sum of the distances $(D_1+D_2)$ which was previously indicated by the distance between spots 110 and 114 on the detector 108 or by the pulse time difference $(\tau_2 - \tau_1)$ is now indicated by the distance between spots 110' and 114' or by the pulse time difference $(\tau_2' - \tau_1')$. Since the time shift of the pulses, for example, is about the same in both cases, that is $$(\tau_1' - \tau_1) \simeq (\tau_2' - \tau_2) \simeq \Delta\tau$$

or $$\tau_1' \simeq \tau_1 + \tau \text{ and } \tau_2' \simeq \tau_2 + \Delta\tau$$

The new measurement indicated by $$\tau_2' - \tau_1' \simeq (\tau_2 + \Delta\tau) - (\tau_1 + \Delta\tau) \simeq (\tau_2 - \tau_1)$$

is about the same as before. It is thus apparent that when the values $(D_1 + D_2)$ and $D_o$ are derived from the $\tau$ values, and the typical computation of equation (5) is used to produce a material thickness property t response, the t response will have a substantially decreased susceptibility, or even no susceptibility to change with the changes in the distance relationship of the sensor and the reference 56 or reference surface 42a or the bottom surface of material 40, assuming that no change occurs in the positions of these references relative to each other.

In a commercial caliper gauge or the like, even with the use of a laser light source and good optics the spots 110 and 114 may each be of such a size as to illuminate a number of photodiodes in detector 108 simultaneously, with a distribution of light intensities. This, inter alia, causes each of the pulses at $\tau_1$ and $\tau_2$ to represent a distribution of time or distance values rather than a single discrete value. Hence, in order to achieve more precise and accurate resolution of small distances or thicknesses, it is appropriate to use any one of several conventional techniques for locating the centroids of the pulses. These techniques, which are used or which have proposed for use in similar optical instruments, can locate the position, say, of a spot such as spot 110 with a resolution substantially smaller than the distance between the individual photodiodes in the array of detector 108.

A simple and straightforward statistical technique for approximating the location of the centroid $\bar{\tau}_1$ of the pulse at $\tau_1$ can use the computation $$\bar{\tau}_1 = \frac{\Sigma \tau_i A_i}{\Sigma A_i}$$

where $\tau_i$ can represent successively the times at which the individual photodiodes are scanned during a line-scan cycle and $A_i$ can represent successively the corresponding amplitudes of the signal components derived from the scanned photodiodes. To locate the centroid of the pulse at $\tau_1$, it is only necessary to perform the summation over that portion of the $\tau$ waveform 118 wherein the $\tau_1$ pulse or portions thereof can be expected to occur, and the same is true for the location of the pulse at $\tau_2$.

For digital computations $\tau_i$ can be represented by the count of the number of clock pulses that drive the shift register in the self-scanning array of detector 108, and $A_i$ can be represented by the count of the number of voltage increments required to equal the corresponding value of the signal amplitude A, as derived from the usual analog-to-digital converter.

Refinements of this technique for more accurately locating the centroid are described in a report by Goss, W. C., Bobrow, J. J. and Buttler, W. P., "Improved Resolution for Sensor Arrays" for NASA Tech Brief Winter 1976, Item 1, from JPL Invention Report 30-3363/NPO-13745 under NASA Contract NAS 7-100, Jet Propulsion Laboratory, California Institute of Technology, Pasadena, Calif., March, 1977. This JPL report contemplates the use of charge-coupled image sensing device (CCD) arrays, and obviously a CCD array or other suitable detector can be used as detector 108 in FIG. 4 if desired. Instead of using digital techniques for centroid location, one may use an analog technique, for example, the approximation technique described in U.S. Pat. No. 4,039,825.

In FIG. 5, a gauging head 120 (that may correspond to sensor box 44 of FIG. 3) and a gauging head location transducer 122 (that may correspond to helical potentiometer 66 of FIG. 3) are shown connected to a conventional stored-program, general-purpose or process-control type of digital computer 124 (that may correspond to computer 76 of FIG. 3). Computer 124 may include the usual input-output (I/O) unit 124a, control unit 124b, central processing unit 124c and memory 124d. For convenience of graphic illustration and convenience, the memory portion is shown as a separate box 126 that will hereafter be termed the "memory", with the remaining units shown in a box 128 that will be termed the "computer".

Computer 128 is shown to be receiving sensor $D_1(\tau)$ and distance $D_2(\tau)$ response values on separate lines 130 and 132, although as shown by FIG. 4 only a single input or set of input lines may be required. Computer 128 also receives a gauging head location response f(x) value on line 134 from transducer 122. Using the input or inputs on lines 130 and 132, the computer 128 performs the conventional calculations employed in optical triangulation to derive the distance values $D_1$ and $D_2$ and/or the sum of the distance values $(D_1 + D_2)$. These calculations are repeated at each one of the locations of the gauging head 120 (sensor box 44) across the width of the sheet material 40 where a thickness measurement is desired.

When the sheet material 40 is absent from the normal inspection location, the computer 128 produces sensor $(D_1)_o$ and the distance $(D_2)_o$ related values or a value $(D_1 + D_2)_o = D_o$ at each one of the desired locations across the width of the region normally occupied by the sheet material. These values are used to produce a stored record in memory 126. Using the input f(x) on line 134, the computer responds to the location of the sensor means (in gauge 120) along its path across the width of the region normally occupied by the sheet to relate the values in the stored record to the sensor means location. As illustrated, the $D_o$ values are transferred to memory 126 via line 136. Each $D_o$ value is placed in a memory storage location that is reserved for a value derived from a sensor location at a particular distance x (FIG. 3). When the gauging head 120 (sensor box 44) has been traversed across the entire sheet width, the memory 126 will contain a table of $D_o$ values, each one associated with a particular distance x. These values represent points on a profile curve such as that shown, for purposes of graphic illustration, at 138 in FIG. 5. The shape of the curve 138 is the resultant of the catenary formed by the tape that defines the reference path 56, the quasi-catenary path of sensor box 44 that may result from any allowable sag in the guide tubes 46 (FIG. 3) and the shape of the sheet material support member 42.

When the sheet material 40 is present and its thickness t is being measured, the computer 128 again uses the f(x) response values on line 134 to relate the values in the stored record to the sensor means location. The computer thereby responds to the proper sensor location-related stored-record values in memory 126 to produce the initial sensor and distance response-related values $D_o(x)$. Hence when the computer responds to sensor response values $D_1$ and $D_2$ currently being derived from gauging head 120 (sensor box 44) is also responds to an initial value $D_o$ that was derived from the same cross-sheet sensor location as the current location. Thus the computer automatically implements the profile equation (6), producing a material thickness property response t as on an output line 140 in response to initial values, and sensor and distance response values, from corresponding locations across the width of the sheet.

FIG. 6 shows a portion of the apparatus of FIG. 3, including a sheet material 40 to be measured over a support 42 (whose top surface 42a defines a first reference position), a sensor box 44, guide tubes 46 and a tape or filament defining a second reference position or reference path 56. The sensor box 44 is shown containing elements of FIG. 4 including the light beam 84 from mirror 100 that projects a spot 86 of light onto the tape reference path 56, mirror 104, lens 106 and detector 108. As in FIG. 5, line 132 connects the $D_2(\tau)$ response signal to a computer means 128 having a memory 126, and computer 128 also receives via line 134 the f(x) signal from a gauging head position transducer.

FIG. 6 differs from FIGS. 3, 4 and 5 in that the material sensing means comprises a nuclear radiation instrument, basically similar to that described in U.S. Pat. No. 2,951,161 supra, for measuring the mass per unit area of the sheet 40 in units such as pounds per square yard or grams per square meter. The sensing means may include a radioisotope source 150 that emits beta rays 151 through a shielding collimator 152 to impinge on the material of sheet 40. The beta rays penetrate the sheet 40 and are reflected from the support 42 and the sheet back into a radiation detector 154 here illustrated as an ionization chamber partially surrounding the source 150. The detector 154 is shown to be connected via a line 156 to an associated standardizing module 158 whose well-known function is to cause the detector output response S on line 160 to have a predetermined value under known conditions, such as when the material 40 is absent (having zero mass per unit area). In many cases it is appropriate for the function of the module 158 to be performed by the computer 128.

The sensor means including the detector 154 and standardizing module 158 of FIG. 6 responds to a condition of the material including the number and kind of atoms contained in a given volume of the material and its thickness to produce a sensor response S, as on line 160, that can be related to the mass per unit area property of the material through a mathematically and/or empirically derived function such as that shown and described in U.S. Pat. No. 2,951,161 supra. However, the relation of the sensor response S to the property is susceptible to change with changes in the distance relationship of the sensor means (in box 44) and the reference position 42a or the bottom surface of the material 40. These response changes are due, for example, to the varying degree of beta radiation absorption by the changing mass of the air column in the space between the material 40 and the source 150 and detector 154, and changes in the solid angles subtended by the source collimator 152 and the detector 154 with respect to the spot of beta radiation projected by the source 150 onto the sheet 40 and support 42.

As previously described, the optical system, the detector 108 and computer 128 each in turn produce a distance response to changes in the distance $D_2$ from sensor box 44 to the reference path 56. During an initial calibration procedure, the sensor box 44 is intentionally deflected mechanically by incremental amounts measureable as $\Delta D_2$. The magnitude of each deflection $\Delta D_2$ is a distance response-related value that can be derived from the response of the optical distance measuring system in response to the second reference position or reference path 56. Each deflection magnitude $\Delta D_2$ is associated with a corresponding observed change $\Delta S$ in the standardized sensor response S.

Hence each $\Delta S$ value is an initial sensor and distance response-related value that can be derived by utilizing the first reference position defined by the top beta ray reflecting surface 42a of support 42 and the second reference position 56, defined by the tape. The $\Delta S$ values may be derived using the bare surface 42a of support 42. However, during normal measurement many of the beta rays 151 penetrate the material 40 to be reflected from surface 42a and to again penetrate the material 40 before being detected by detector 154. Typically it may be desirable to simulate the normal measurement conditions by deriving the $\Delta S$ values with a fixed sample of material covering the surface 42a of support 42, the sample having about the same composition and mass per unit area as the material 40 normally measured.

When a full range of $\Delta D_2$ and corresponding $\Delta S$ values have been determined, the computer will have stored in its memory 126 a table of values, or the calculated coefficients for an analytic function, relating the deflection magnitudes $\Delta D_2$ to the sensor response change $\Delta S$. For purposes of graphic illustration, a curve 162 is shown to represent the analytic function. If a table of values is used, the values in the table define points on the curve.

In a manner similar to that previously described in connection with FIG. 5, the f(x) input on line 134 is used to generate the addresses, in memory 126, for a number of distance response-related values $(D_2)_o$ obtained as the sensor box 44 is traversed across the width of the material 40, resulting in a stored table of values represented graphically as a profile curve 164. The values represented by curve 164 are derived during a preliminary scan of the sensor box 44, usually with the material 40 absent, across the width of the part of support 42 normally covered by the sheet of material. This preliminary scan may typically be the same one used to enable computer 128 to store the "air profile" values according to the prior art technique previously mentioned, under conditions such that the sensor can be assumed to be following its nominal sensor path (represented by dashed line 52 in FIG. 3).

During normal measurement of sheet 40, computer 128 continually uses the f(x) input on line 134 to retrieve from its memory 126 a $(D_2)_o$ value corresponding to the current cross-sheet location of the sensor means.

The computer responds to the current distance response value $D_2$ by subtracting it from the original $(D_2)_o$ value to find the magnitude $\Delta D_2$ of any change in the distance $D_2$ from the sensor means to the reference position or reference path 56. The computer also responds to the current sensor response value S, as well as to an initial sensor and distance response-related value $\Delta S$ that it produces from memory 126 in accordance with the corresponding computed magnitude of $D_2$. From these values the computer produces a material property response $(S+\Delta S)$ as on an output line 168.

Since the response $(S+\Delta S)$ has a substantially reduced susceptibility to change with the changes in the distance relationship of the sensor means and the reference position defined by the top surface 42a of support 42 or bottom surface of the material 40, the response $(S+\Delta S)$ is typically used by computer 128 or other device, in lieu of the sensor response S, to derive values for the measured mass per unit area of the sheet material 40. The sensor response S is an uncorrected response that can be related to the sheet mass per unit area property, but is subject to error due to changes in the distance relationship of the sensor and the one reference position or bottom surface of the material. However, by deriving and adding $\Delta S$ as described, the uncorrected response is systematically related to the distance response so as to produce a substantially corrected sheet property response.

The embodiments of the invention so far described are adapted for measurements of materials that are nominally constrained to a position such that one side of the material is always in contact with a support member as at 16 or 42 whose surface 16a or 42a defines the first reference position. However, in perhaps the most common sheet gauging situation the sheet is unsupported at the inspection location.

As shown in FIG. 7, a sheet of material 170 is normally inspected according to the present invention while traveling generally along a nominal sheet path that is located in a predetermined spatial relation to a first reference position or reference path 56a defined by a tape or filament that may be constructed and mounted in a manner substantially identical or similar to that of the tape or filament that defines the second reference position or reference path 56 in FIGS. 3 or 6.

A first gauging head or sensor box 172 is supported on guide tubes 46 as in FIG. 3 and a second gauging head or sensor box 172a is supported on guide tubes 46a. Gauging head 172 contains optical apparatus substantially identical to that shown in FIG. 4, and the same reference numerals are used in FIG. 7 to designate the corresponding parts, with the suffix a added to identify the parts in gauging head 172a.

The four light beams 84, 84a, 90 and 90a, incident on the reference tapes defining positions 56 and 56a and the sheet 170, are typically all collinear as shown to minimize errors due to offset if the reference paths 56 and 56a change with respect to each other in a manner that permits a computed correction after the initial sensor and distance response-related values have been established in the computer memory. If the transparency of the sheet is such that one or both of the detectors 108 and 108a might be unable to clearly distinguish its respective illuminated spot from the light transmitted through the sheet from the spot projected onto the other side, it can be arranged for the lasers 92 (not shown in FIGS. 7 and 8) to produce light of different wavelengths, and suitable filters can be installed, say, in association with the lenses 106 and 106a to render the detectors substantially insensitive to the improper wavelength. A time-division scheme can also be used, wherein light pulses are directed alternately to opposite sides of the sheet and the detectors respond alternately to the proper projected spots.

As in the embodiments of the invention shown in FIGS. 2 to 5, the embodiment of FIG. 7 is typically a sheet caliper gauge for determining the sheet material thickness property. The sensor means comprises optical sensor elements 90, 102, 112, 106 and 108 in gauging head 172 and optical sensor elements 90a, 102a, 112a, 106a and 108a in gauging head 172a.

Figure 9:
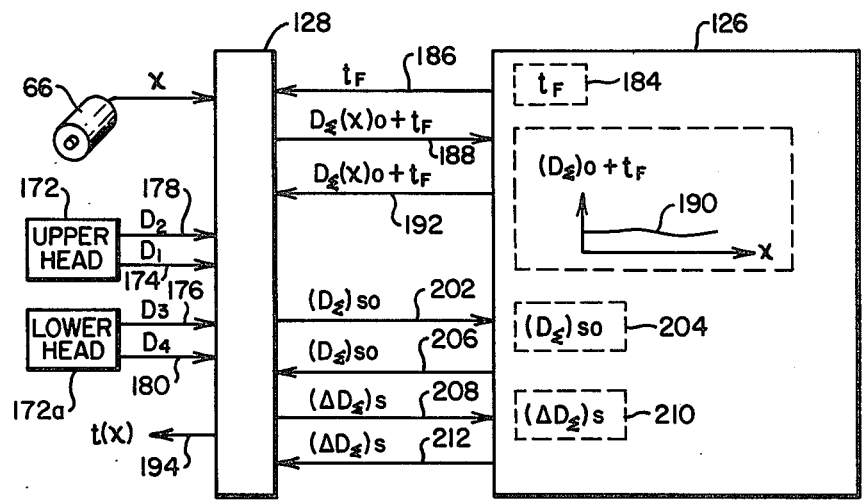
FIG. 9 is a diagrammatic sketch illustrating a typical data processing scheme that can be used in combination with the apparatus of FIGS. 7 and 8 to produce a sheet caliper response.

This sensor means produces a sensor response that is a combination of two responses, derived from detectors 108 and 108a and shown in FIG. 9 to be received over lines 174 and 176 by a computer 128 from the upper 172 and lower 172a guaging heads respectively. The two detector responses are effectively indicative of the distances $D_1$ and $D_3$ from the respective gauging heads 172 and 172a to the material, and the combination sensor response can be related to the material thickness property t as taught, for example, by U.S. Pat. Nos. 3,565,531 and 3,671,726.

However, the relation of the sensor response to the thickness is susceptible to change with changes in the distance relationship of the sensor means and either one of the reference positions or the material. Accordingly there is produced a distance response to changes in the distance from the sensor means to the reference positions, or reference paths, 56 and 56a. The distance response is a combination of two responses derived from detectors 108 and 108a and shown in FIG. 9 to be received over lines 178 and 180 by computer 128 from the upper and lower gauging heads 172 and 172a respectively. The two detector responses are effectively indicative of the distances $D_2$ and $D_4$ from the heads to the respective reference paths 56 and 56a.

FIG. 8 shows a representation of the apparatus of FIG. 7 that is useful in combination with FIG. 9 for explaining the setup and operation of a typical caliper gauge embodiment of the invention. In FIG. 8 the gauging heads of FIG. 7 are represented by the corresponding numerals 172 and 172a, and lines 84, 84a, 90 and 90a represent the corresponding incident light beams.

When the sheet 170 is absent from its normal measuring location, a hinged or otherwise movable target fixture 182 is moved from the inactive position shown in solid lines to the operative position 182' shown in dashed lines. Here the fixture forms a target, for the sheet sensor light beams 90 and 90a, in a position normally occupied by the sheet 170. The position of the target fixture 182 can be changed manually, but typically it is moved automatically by a solenoid, air cylinder or other motor means; say, in response to a signal, from computer 128 (FIG. 9), that is generated at an appropriate time when the sheet 170 is absent.

The gauging heads are now traversed across the width of the position normally occupied by the sheet 170. At each gauging head location x where a sheet caliper measurement is desired, computer 128 computes two initial sensor response-related values $(D_1)_o$ and $(D_3)_o$ and two initial distance response-related values $(D_2)_o$ and $(D_4)_o$ corresponding to the distances shown in FIG. 8. The computer then adds the four sensor and distance response-related values to obtain $$(D_\Sigma)_o = (D_1)_o + (D_2)_o + (D_3)_o + (D_4)_o \quad (7)$$

The sensor and distance response-related value $(D_\Sigma)_o$ is then added to the target fixture thickness $t_F$ that has been previously stored in a memory location 184 of memory 126 and is shown to be retrieved by the computer via line 186. The result is an initial sensor and distance response-related value $(D_\Sigma)_o + t_F$.

As each successive value of $(D_\Sigma)_o + t_F$ is derived, the corresponding distance x signalled by the gauging head location transducer 66 is used to generate successive addresses in memory 126 to which the values are transmitted, via line 188 as shown, and stored. When the gauging heads 172 and 172a have been traversed across the full width of the region normally occupied by the sheet during measurement, the memory will contain a table of initial sensor and distance response-related values representing a profile curve illustrated graphically at 190. The values in the memory can be retrieved by computer 128, via line 192 as shown, during measurement of the sheet material 170 to produce initial sensor and distance response-related values that can be used in combination with the current sensor resonse values $D_1$ and $D_3$ and the current distance response values $D_2$ and $D_4$ to produce the desired material thickness property response t(x), as on an output line 194.

However, the process that produces or modifies the sheet 170 may run for long periods of time without interruption to permit rechecking of the $(D_\Sigma)_o$ values. On the other hand it is highly desirable to make standardization checks at rather frequent intervals, and it is common practice to move gauging heads as at 172 and 172a off sheet for standardization purposes.

Hence, in a further refinement, the illustrative caliper gauge according to the invention is typically adapted for off-sheet standardization as frequently as desired. To this end, at the same time the profile values $(D_\Sigma)_o + t_F$ are derived and stored in memory 126, the target fixture 182 is returned to its inactive position as shown by the solid lines and the gauging heads are moved further to an off-sheet position as shown at 172′ and 172a′ at the right side of FIG. 8. In a manner similar to that shown and described in U.S. Pat. No. 2,951,161, the heads are positioned so that the light beams 90 and 90a impinge on a "sample" or "standardization plate" 196. The sample 196 can be made of any suitable material so long as it is highly stable dimensionally, of very uniform thickness so that slight errors in positioning of heads 172′ and 172a′ will not cause the optical systems therein to see different thicknesses on different trips to the off-sheet position, and with a suitable surface for forming difusely illuminated spots when the light beams 90 and 90a impinge on it. The specific thickness of the sample is immaterial, so long as it is reasonably close to the range of material thicknesses ordinarily measured.

When the gauging heads 172′ and 172a′ are in the off-sheet position, the light beams 84 and 84a impinge on two other targets 198 and 200. While these targets may constitute parts of the tapes that define reference paths 56 and 56a respectively, this is not necessary and it may be preferable to provide separate targets as shown. The targets 198 and 200 need not be located at the same nominal distance from the gauging heads as are the tapes defining reference paths 56 and 56a. The optical systems now respond to four distances, $(D_1)_S$, $(D_2)_S$, $(D_3)_S$ and $(D_4)_S$, whose sum $$(D_\Sigma)_s = (D_1)_s + (D_2)_s + (D_3)_s + (D_4)_s \tag{8}$$

is computed by computer 128 at each off-sheet standardization time. This sum is compared with the sum $$(D_\Sigma)_{so} = (D_1)_{so} + (D_2)_{so} + (D_3)_{so} + (D_4)_{so} \tag{9}$$

of the distances computed at the same time the $(D_\Sigma)_o$ profile values are recorded when the sheet material is absent. As shown in FIG. 9, the $(D_\Sigma)_{so}$ value is transmitted via line 202 to memory 126 and stored in a memory location 204. Then during each ordinary standardization with the sheet present, the computer 128 retrieves the $(D_\Sigma)_{so}$ value from memory, via line 206 as shown, and subtracts it from the currently computed value to obtain $$(\Delta D_\Sigma)_s = (D_\Sigma)_s - (D_\Sigma)_{so}. \tag{10}$$

$(\Delta D_\Sigma)_s$ indicates the combined magnitude and direction of drifts in the measurements provided by the optical distance measuring systems. These drifts are treated as if they are linear or nearly linear offsets, which is usually the case. If the nature of the drifts are such that they significantly affect the slope, or gain, of the computed thickness function, the use of an appropriate compensation factor may be necessary. The $(\Delta D)_\Sigma)_s$ value is transmitted to the memory, as shown by line 208 and stored in a memory location 210. During measurement of material 170 it is retrieved from memory, as shown by line 212, and is used as an offset to compute the sheet material caliper or thickness property response values, i.e., $$t = (D_\Sigma)_o + t_F - D_\Sigma + (\Delta D_\Sigma)_s \tag{11}$$

that appear as profile thickness values t(x) as on an output line 194 from computer 128. In equation (11) the quantity $D_\Sigma$ of course represents the sum $D_1 + D_2 + D_3 + D_4$.

Figure 10:
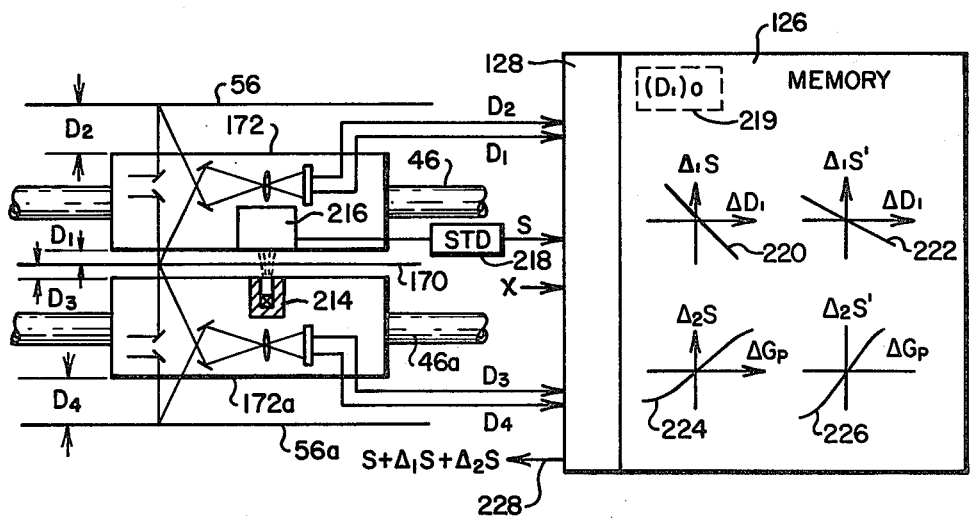
FIG. 10 is a diagrammatic sketch illustrating a typical addition of a beta ray transmission sensor to the apparatus of FIGS. 7, 8 and 9, together with a typical addition to the data processing scheme that is adapted to produce a sheet mass per unit area response.

FIG. 10 illustrates a typical example of the addition of a further sensor means to the caliper gauge system of FIGS. 7–9. FIG. 10 again shows the sheet material 170, the upper gauging head 172 and lower gauging head 172a, and the reference paths 56 and 56a. Also shown is the computer 128, receiving responses indicative of $D_1$, $D_2$, $D_3$, and $D_4$ from the optical instruments in heads 172 and 172a, and the head location response x.

In addition to the optical instruments, whose parts reference numerals are omitted, the gauging heads contain a mass per unit area sensor means comprising a nuclear radiation source unit 214 in head 172a and a radiation detector 216 in head 172. This sensor means responds to a condition of the sheet material 170 including the number and type of atoms contained in a unit volume of the material and its thickness to derive a sensor response that is modified by a standardization module 218 to produce a standardized sensor response S received by computer 128. As is the case with the standardization module 158 of FIG. 6, the function of standardization module 218 can be conveniently performed by computer 128 if desired.

The sensor response S can be related to the mass per unit area property, but the relation of the response to the property is susceptible to change with changes in the distance relationship of the sensor means (214 in head 172a and/or 216 in head 172) and one (or both) of the reference positions 56 and 56a or the material 170. The distance relationship is simplified by considering that all possible vertical (as shown) displacements, or combination of vertical displacements, of gauging heads 172 and 172a and the sheet material 170 can be resolved into "flutter" and "deflection" distance changes. "Flutter" is defined for present purposes as deviations of the distance $D_1$ from a selected value $(D_1)_o$ that is stored in a location 219 in the computer memory 126. The distance $D_1$ has the value $(D_1)_o$ when the sheet material 170 is traveling in the nominal sheet path (established generally by the arrangement of the processing machine that produces or modifies the material) and the gauging head 172 is following the nominal sensor path (established on installation of the traversing gauge mount, cf FIG. 3). The value $(D_1)_o$ is selected for reasons such as to allow the sheet to travel through the pass gap between heads 172 and 172a along a "pass line" that is nearly centered between the heads, or to accommodate some requirement or characteristic of one or more of the several sensors that may be contained in the heads. According to the present definition the flutter is given by $$\Delta D_1 = D_1 - (D_1)_o \quad (12)$$

whether the change in the distance $D_1$ is caused by up-or-down movement of the sheet 170 or by up-or-down movement of the gauging head 172 or by a combination of both movements.

For present purposes "deflection" is defined as a deviation of the pass gap dimension from a predetermined value that is established when the instrument is manufactured and/or installed on the process line. A standardization reference value for the pass gap dimension can be determined by the optical systems in heads 172 and 172a when the heads are in the off-sheet standardization position, as shown by the dotted lines at the right side of FIG. 8. Thus at the time the standardization module 218 establishes the standardization value for the nucleonic sensor response S, the optical systems determine the pass gap dimension standardization value $(G_p)_S$ from $$(G_p)_S = (D_1 + D_3)_S + t_S \quad (13)$$

where $(D_1 + D_3)_S = (D_1)_S + (D_3)_S$ as shown in FIG. 8, and $t_S$ is the thickness of the optical system standardization sample 196.

During measurement of the sheet material 170, the pass gap dimension is found from $$G_p = D_1 + D_3 + t \quad (14)$$

and the deflection $\Delta G_p$ is found from $$\Delta G_p = G_p - (G_p)_S \quad (15)$$

In a calibration or pre-calibration setup procedure for the nucleonic sensor 214, 216, 218, the gauging heads 172 and 172a may be moved to a position along guide tubes 46 and 46a, say, near the off-sheet standardization position, where the deflection $\Delta G_p = 0$. A conventional calibration fixture (not shown) is used to support a sample of the material to be measured in the pass gap between heads 172 and 172a, at an adjustable distance $D_1$ from the upper head or detector head 172.

As the sample is moved to various positions at selected distances $D_1$, the corresponding flutter values $\Delta D_1$ are determined, e.g., from equation (12). At the same time the amount and direction of the corresponding changes $\Delta_1 S$ in the signal S, relative to the signal value obtained at the nominal pass line (where $D_1 = (D_1)_o$), are determined and a "look-up" table of values are recorded in the computer memory 126. For purposes of graphic illustration, there is shown in memory box 126 a flutter curve or function 220 relating $\Delta D_1$ to $\Delta_1 S$. The recorded values define points on the flutter curve 220.

Since the shape of flutter curves is generally different for different values of the mass per unit area of the material being measured, the flutter curve determination may need to be repeated using one or two additional samples of material having substantially different mass per unit area values. The second flutter curve 222 graphically depicts the values $\Delta_1 S'$ in a different recorded look-up table related to a different material sample.

In addition to the flutter curves 220 and 222, the memory box 126 is shown to contain two deflection curves 224 and 226, representing two corresponding look-up tables of values that are stored in the computer memory. To derive such values, the calibration fixture (not shown) is used to support a sample of the material to be measured at the pass line (a distance $(D_1)_o$ from the upper head 172). The lower head 172a is now deliberately deflected to various vertical positions so as to obtain a range of selected values for the pass gap dimension $G_p$ and the deflection $\Delta G_p$. The $\Delta G_p$ values can be derived most conveniently utilizing the first and second reference positions, the optical systems, the detectors and the computer to determine first the thickness t of the sample and then the deflection, following the procedures described above. The magnitudes and directions of the changes $\Delta_2 S$ in the value of the response S for each of the deflection values $\Delta G_p$ are used as the look-up table values represented by curve 224. Curves 226 represents the values in another look-up table derived with the use of a sheet material sample having a substantially different mass per unit area.

When the system is in operation to measure the traveling sheet material 170, the sensor means comprising source unit 214 and detector unit 216 produces the sensor response S that is related to the sheet mass per unit area property (e.g., pounds per ream or grams per square meter). The relation of the response S to the property is susceptible to change with changes, for example, in the distance relationship of the source unit 214 and the reference path 56a. If only the source unit 214 moves vertically, for example, to produce this change, there is also a change in the distance relationship of the source unit 214 and the sheet material 170.

The optical distance measuring elements and detector in the gauging head 172a produce, inter alia, the distance response $D_4$, which changes with the change in the distance from the sensor means source unit 214 to the reference position 56a. Similarly the optical elements and detector in gauging head 172 produce the distance response $D_2$, inter alia. The response $D_4$ and $D_2$, derived by utilizing the first and second reference positions 56a and 56, are in turn utilized, along with the responses $D_1$ and $D_3$, by computer 128 which responds by computing the sheet material thickness t and the deflection $\Delta G_p$, and by selecting the corresponding initial sensor and distance response-related value $\Delta_2 S$ which the computer produces from memory 126 in accordance with the computed deflection $\Delta G_p$.

Computer 128 also responds to the sensor response S and the initial value $\Delta_2 S$ by adding them to produce a material property response $S + \Delta_2 S$ as indicated by an output line 228. If there is any flutter effect to be compensated, the computer also adds a $\Delta_1 S$ value selected, as shown, from one of the functions 220 or 222 to produce a material property response such as $S + \Delta_1 S + \Delta_2 S$. This response, which has a substantially decreased susceptibility to change with changes in the distance relationship of the sensor means and the reference position or the material, is utilized in lieu of the raw signal S, either by computer 128 or another device, to indicate, record and/or control the mass per unit area parameter of the sheet material 170.

In producing the material property response according to the illustrated embodiment, the computer 128 may select a flutter compensation value $\Delta_1 S$ from the function 220 or a value $\Delta_1 S'$ from the function 222 on the basis of a criterion such as $$S_1 < S < S_2 \rightarrow f(220)$$

and $$S_2 < S < S_3 \rightarrow f(222)$$

Similarly the computer may select a deflection compensation value function on the basis of $$S_4 < S < S_5 \rightarrow f(224)$$

and $$S_5 < S < S_6 \rightarrow f(226).$$

Here $S_1$ to $S_6$ are empirically determined values depending on the particular ranges of mass per unit area values to be encountered in a given measurement application.

Figure 11:
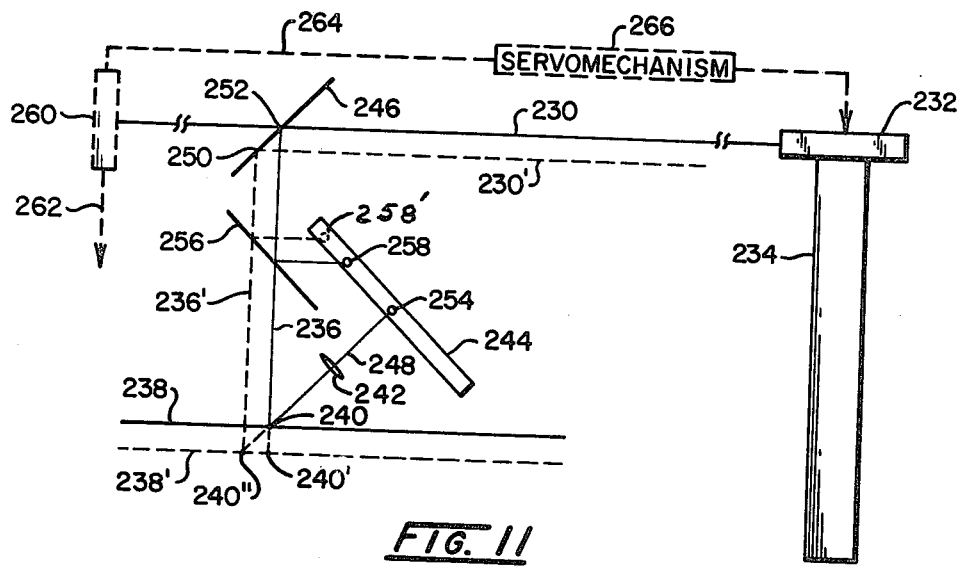
FIG. 11 is a diagrammatic sketch illustrating a typical arrangement using a laser beam as a reference position defining means, together with an optical system adapted for distance or thickness measurements.

In the embodiment of the invention illustrated in FIG. 11, the second reference position or reference path is typically defined by a laser beam 230 that may be generated by an off-sheet laser beam projector 232 mounted on a pedestal 234. The gauging head (not shown), that may be similar to that shown at 44 in FIG. 4, contains sensor means including means to project a light beam 236 onto the top surface 238 of a material to be measured. The spot of diffused light formed at a point 240 is imaged by a lens system 242 onto a detector array 244.

This arrangement constitutes a caliper sensor, similar to that constituted by elements 90, 112, 106 and 108 of FIG. 4, that is capable of measuring, by optical triangulation, the thickness property of a material whose top surface is represented at 238. However, here again the relation of the sensor response to the property is susceptible to change with changes in the distance relationship of the sensor means and one of the reference positions or the material.

In this embodiment, the means for projecting the light beam 236 also performs the functions of producing a distance response to changes in the distance from the sensor means to the second reference position defined by laser beam 230 and making a first-order correction for the error that could otherwise result from the distance change. To this end, a plane mirror 246 is mounted (in the gauging head) at an angle of 45° to the plane of the nominal sheet path (in the vicinity of the top surface 238 of the material) and also is at an angle of 45° to the laser beam 230. The mirror 246 deflects the laser beam 230 through an angle of 90° to form the beam 236 that is projected onto the material surface 238. Typically the axis of the detector optical system (in the vicinity of the reflected beam shown at 248) is nominally at an angle of 45° to the plane of the nominal sheet path.

As was done in the discussion of FIG. 4, supra, let it be assumed that the sensor means moves upwardly from its nominal position or path. From the viewpoint of the sensor means, it now appears that the top surface 238 of the material has moved downwardly to the position shown by the dotted line 238'. This would normally result in an error in the sensor response, since from the viewpoint of the sensor the illuminated spot 240 would appear at 240' and the image of the spot would appear at a different point on the detector array 244.

However, when the sensor means moves upwardly, the mirror 246 moves upwardly also, so that as shown by the dotted lines the laser beam 230' is intercepted by the mirror 246 at a point 250 instead of at a point 252 as previously. This produces a distance response by shifting the axis of the projected beam 236 to a new position shown by the dotted line 236' so as to illuminate a spot 240'' on the apparently displaced sheet surface 238' instead of illuminating spot 240'. If there is no change in the conditions of the measurement except for the upward movement of the sensor means and mirror 246, the shift in the illuminated spot position from 240' to 240'' is just sufficient to cancel the angular effect of the upward movement, so that the angular position of spot 240'' is the same as the angular position of the original spot 240. Hence there will be no change in the centroid position of the image 254 of the illuminated spot of the detector 244.

Such theoretically perfect compensation for sensor distance changes, however, is obtained only so long as the 45° angular relationships hold exactly, and this is rarely possible under actual measurement conditions. Even a slight change in the thickness of the material being measured is sufficient to move the illuminated spot and its image off of the 45° optical axis.

If the measurement application requires a higher degree of accuracy than can be obtained with the purely optical distance response compensation just described, arrangements can be made for providing an additional distance response that can be processed, for example, by the computer 124. One arrangement comprises a beam splitter 256, placed in the path of the projected beam 236, so as to project an additional spot of laser light 258 onto the detector 244, or alternately, onto a separate detector array (not shown) that may be provided for the purpose. With this arrangement, when the beam 236 moves to a position as at 236' as a result of upward or downward movement of the sensor system, the light spot 258 will move to another position as at 258', thus producing an electrical signal that can be utilized by the computer.

The signal pulse (resulting, e.g., from the illumination of photodiodes in the detector array 244 by the spot 258) can be used by the computer to compensate for tilt of the gauging head as well as for the vertical movement. It will be noted, however, that in the arrangement shown the effects of tilt are no inherently self-compensated by the mere process of electrically scanning the photodiode array as described in connection with FIG. 4, since in the case of tilt the light spot 258 moves in the wrong direction. Hence the signal component due to the light spot 258 must be separately processed by the detector unless some optical beam-crossing and lensing arrangements are made. Aside from the effects of tilt this signal component is used to compensate the measurement for changes in optical magnification due to the changes in the standoff distance, as appears from the calculations shown in the Appendix below.

In the event that the laser beam 230 should be subject to deflection as a result of temperature effects or other effects, one arrangement that can be used to correct or compensate for such effects is shown in FIG. 11. According to this arrangement, the mirror 256 is a beam splitter that allows a portion (perhaps 10%) of the light in laser beam 230 to pass to an off-sheet position and impinge on a detector array 260. If the beam 230 deviates from the target point on the detector 260, a signal can be generated as on a line 262 and fed to the computer so that suitable compensation can be made to correct the material property response. Alternately, a signal can be generated as on a line 264 and utilized by a servomechanism as indicated at 266 to correct the aim of the laser beam projector 232.

While the invention has been described and illustrated by particular procedures and particular apparatus, the showing and description is meant to be illustrative only and not restrictive, since obviously many changes and modifications can be made without departing from the spirit and scope of the invention. For example, while a taut tape and a laser beam have been shown as examples of a means for defining a reference position or reference path, obviously such structures as heavy steel beams or complex mechanical structures can be used to make such means as stable as desired. On the other hand, it is not necessary that the reference position or path be fixed or stable, so long as its position is precisely known or predictable. For example, if a reference tape should be subject to flutter or flap, the distance response can be based on an appropriate statistical model rather than an instantaneous distance measurement. While optical methods and devices have been illustrated for producing or initiating a distance response to changes in the distance from the sensor means to a reference position or reference path, obviously other methods and devices such as magneto-electric devices disclosed in U.S. Pat. No. 3,348,057 can be used.

APPENDIX

Figure 12:
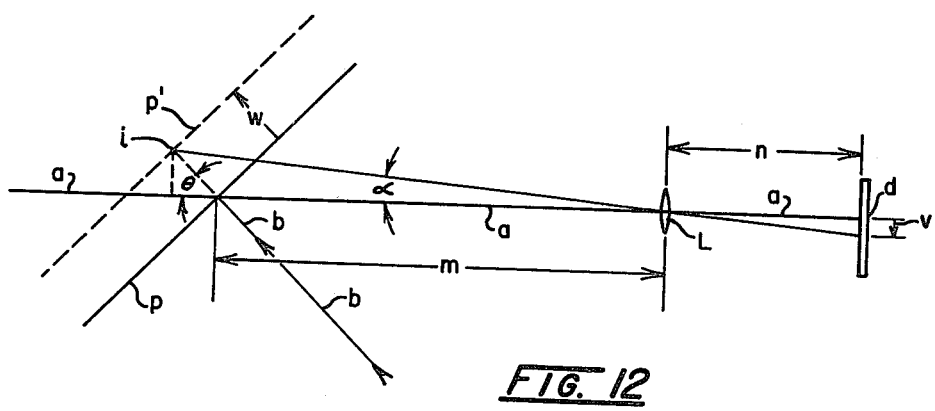
FIG. 12 is a sketch illustrating an unfolded version of the optical system of FIG. 4 or FIG. 11 that is useful in explaining the computation of distances and thicknesses given in the Appendix.

When the optics of FIG. 4, for example, are "unfolded", they can be represented by the sketch of FIG. 12, which is similar to that of the basic sensor of FIG. 11. In FIG. 12, a is the optical axis of the detector system; b is the axis of the laser beam; p is a reference plane at some nominal standoff distance m from the lens L; p' is the plane of the surface of the position reference tape or the material currently being measured; d is the detector array which is mounted at a distance n from the lens L; $\theta$ is the acute angle between the axis a and the laser beam b; $\alpha$ is the angle, measured from the effective center of the lens L, between the optical axis a of the detector system and the intersection i of the laser beam b with the material surface plane p'; v is the distance, along the detector d array, from the optical axis a to the image of the light spot at i, and w is the distance, being measured, from the reference plane p to the position reference tape or material surface plane p'. The following relations hold, with $c_1$ to $c_6$ being constants:

$$v = n \tan \alpha$$
$$\tan \alpha = \frac{w \sin \theta}{m + w \cos \theta}$$

-continued $$v = \left(\frac{n}{m}\right) \frac{w \sin \theta}{1 + \frac{\cos \theta}{m} w} = \frac{c_1 w}{1 + c_2 w}$$

$$v + c_2 v w = c_1 w$$
$$w(c_1 - c_2 v) = v$$

$$w = \frac{v}{c_1 - c_2 v} = \left(\frac{1}{c_1}\right) \frac{v}{1 - \frac{c_2}{c_1} v}$$

$$w = \frac{c_3 v}{1 - c_4 v}$$

In the foregoing equations, n/m is the optical magnification at the reference plane p and $c_1$ is the effective magnification at the material or tape surface plane p' from the optical magnification and rotation $\theta$. If the plane p' of the material or tape surface is in front of, rather than behind, the reference plane p, the direction of w is reversed, and $$\tan \alpha = \frac{w \sin \theta}{m - w \cos \theta}$$
whence
$$w = \frac{c_5 v}{1 + c_6 v}$$

What is claimed is:

1. A radiant energy method for determining a property of a material that is normally inspected while located generally in a predetermined spatial relation to a first reference position, comprising the steps of
    defining a second reference position,
    utilizing a sensor means to respond to a condition of the material and to produce a sensor response that can be related to the material property, the relation of the sensor response to the property being susceptible to change with changes in the distance relationship of the sensor means and one of the reference positions or the material,
    producing a distance response to changes in the distance from the sensor means to at least one of the reference positions,
    producing an initial sensor and distance response-related value or values that can be derived by utilizing the first and second reference positions, and
    responding to the distance response, the initial value or values, and the sensor response so as to produce a material property response with substantially decreased susceptibility to change with the changes in the distance relationship of the sensor means and the reference position or the material.

2. A method as in claim 1 wherein the material is in the form of a sheet that travels generally along a nominal sheet path, comprising
    supporting and guiding the sensor means generally along at least one nominal sensor path transverse to the sheet path so as to permit sensing the sheet condition at a plurality of locations spaced across the width of the sheet, the actual path or paths of the sensor means being subject to deviations from the nominal path that may result in changes in the distance from the sensor means to the one reference position or the material, and
    wherein the second reference position is defined as a reference path that is relatively independent of at least one factor that tends to produce a deviation of the actual path or paths of the sensor means.

3. A method as in claim 1 comprising
producing a stored record derived from the sensor response and the distance response when the material is absent from its normal inspection location, and
responding to the stored record to produce the initial sensor and distance response-related value.

4. A method as in claim 2 comprising
producing a stored record derived from the sensor response and the distance response when the material is absent from its normal inspection location,
responding to the location of the sensor means along its path across the width of the sheet and relating the values in the stored record to the sensor means location, and
responding to the sensor location-related stored-record values to produce the initial sensor and distance response-related value,
whereby the material property response is produced in response to initial values, and sensor and distance response values, from corresponding locations across the width of the sheet.

5. A method as in any one of claims 1, 2, 3 or 4, wherein the sensor response comprises a response to the distance from the sensor means to one surface of the material, and
wherein the material property response comprises a response to the thickness of the material.

6. A method as in any one of claims 1, 2, 3 or 4 wherein the sensor response is an uncorrected response that can be related to the material property, but in a manner which is subject to error due to changes in the distance from the sensor means to the one reference position or the material, and
wherein the uncorrected response is systematically related to the distance response so as to produce a substantially corrected material property response.

7. A method as in claim 2, which comprises
supporting and guiding a first distance sensor along a first nominal sensor path on one side of the sheet path to produce a first sensor response to the distance from the first distance sensor to the surface of the sheet on the one side thereof,
supporting and guiding a second distance sensor along a second nominal sensor path on the other side of the sheet path to produce a second sensor response to the distance from the second distance sensor to the surface of the sheet on the other side thereof,
defining the first reference position on one side of the nominal sheet path as a reference path that is relatively independent of at least one factor that tends to produce a deviation of the actual path of one of the distance sensors,
defining the second reference position on the other side of the nominal sheet path,
producing a first distance response to the distance from the first distance sensor to the first reference position,
producing a second distance response to the distance from the second distance sensor to the second reference position, and
responding to the initial value or values, the first and second sensor responses and the first and second distance responses to produce a response to the thickness of the sheet.

8. A method as in claim 2, which comprises
supporting and guiding a first sensor means along a first nominal sensor path on one side of the nominal sheet path,
supporting and guiding a second sensor means along a second nominal sensor path on the other side of the nominal sheet path, the sensor means producing an uncorrected response that can be related to the material property but which is subject to error due to changes in the distance from the first, the second, or both sensor means from either or both of the first and second reference positions or the material,
defining the first reference position on one side of the nominal sheet path as a reference path that is relatively independent of at least one factor that tends to produce a deviation of the actual path of the sensor means,
defining the second reference position on the other side of the nominal sheet path,
producing a first distance response to the distance from the first sensor means to the first reference position,
producing a second distance response to the distance from the second sensor means to the second reference position, and
responding to the initial value, the uncorrected sensor response and the first and second distance responses to produce a corrected sensor response to the material property.

9. A method as in claim 8 wherein the first sensor means comprises a radiation source, and the second sensor means comprises a radiation detector for detecting radiation from the source that is transmitted through the sheet.

10. A method as in claim 7 or claim 8, wherein the initial sensor and distance response-related values are produced by the steps comprising
in the absence of the sheet material in the normal inspection location, supporting a test fixture in the region of the nominal sheet path to produce a sensor response to the test fixture,
producing a stored record derived from the sensor means response to the test fixture and the first and second distance responses at a plurality of locations along the path of the sensor means,
responding to the location of the sensor means along its path across the width of the normal inspection location of the sheet material and relating the values in the stored record to the sensor means location, and
responding to the sensor location-related stored-record values to produce the initial sensor and distance response-related values,
whereby the material property response is produced in response to initial values, and sensor and distance response values, from corresponding locations across the width of the sheet.

11. A method as in claim 1 which comprises deriving both the sensor response and the distance response from a common radiation sensor array, and
directing the distance response so that it compensates the sensor response for the changes in the distance relationship.

12. A method as in claim 11 which comprises
producing an illuminated spot on one surface of the material,
producing an illuminated spot at one of the reference positions, optically projecting images of the illuminated spots onto the common sensor array in a manner such that the changes in the distance relationship produce substantially equal movements of both images in the same direction, and responding to the distance between the images to produce a compensated sensor response.

13. A method as in claim 1 wherein the sensor response is produced by directing a light beam onto a surface of the material to produce an illuminated spot thereon and optically projecting an image of the illuminated spot onto a detector.

14. A method as in claim 13 which comprises producing the distance response by shifting the axis of the directed light beam that produces the illuminated spot on the material.

15. A radiant energy method for determining a property of a sheet material that is normally inspected while traveling generally along a nominal sheet path, comprising utilizing a sensor means to respond to a condition of the sheet material and to produce a sensor response that can be related to the material property, the relation of the sensor response to the property being susceptible to change with changes in the distance relationship of the sensor means and the sheet material, supporting and guiding the sensor means generally along at least one nominal sensor path transverse to the sheet path so as to permit sensing the sheet condition at a plurality of locations spaced across the width of the sheet, the actual path or paths of the sensor means being subject to deviations from the nominal path that may result in changes in the distance from the sensor means to the sheet material and thereby adversely influence the sensor response, defining a reference path that is relatively independent of at least one factor that tends to produce a deviation of the actual path or paths of the sensor means, producing a distance response to changes in the distance from the sensor means to the reference path, and systematically relating the sensor response to the distance response so as to produce a sheet property response with substantially decreased susceptibility to change with the changes in the distance relationship of the sensor means and the material.

16. A method as in claim 15 wherein the sensor means response is an uncorrected response that can be related to the property of the sheet material but which is subject to error due to the sensor path deviations, and wherein the uncorrected response is systematically related to the distance response so as to produce a substantially corrected material property response.

17. A method as in claim 15 wherein the distance response is produced by responding to the distance from the sensor means to the reference path and the distance from the sensor means to one side of the sheet.

18. A method as in claim 17 for determining a property of a sheet that travels generally along a nominal sheet path but the actual path of the sheet is subject to deviations from the nominal sheet path so that the sensor means response is influenced by the individual or combined effects of the sensor path and sheet path deviations, and, wherein the uncorrected response is systematically related to the distance response so as to produce a substantially corrected material property response.

19. A method as in claim 17 for determining a property of a sheet whose other side is effectively constrained to a fixed primary reference path, wherein the corrected sensor means response is indicative of the thickness of the sheet.

20. A method as in claim 17 for determining a property of a sheet that travels generally along a nominal sheet path but the actual path of the sheet is subject to deviations from the nominal sheet path so that the sensor means response is influenced by the individual or combined effects of the sensor path and sheet path deviations, comprising defining a second reference path, responding to the distance from the sensor means to the second reference path and the distance from the sensor means to the other side of the sheet, to produce a second distance response, and systematically relating the second distance response to the sensor means response to produce the sheet property response.

21. A method as in claim 20 wherein the first and second distance responses constitute a substantially corrected sensor response, and wherein the corrected sensor means response is indicative of the thickness of the sheet.

22. A method as in claim 20 wherein the sensor means response is an uncorrected response that can be related to the sheet property, but which is subject to error due to the sensor path and sheet path deviations, comprising systematically relating the uncorrected response to the first and second distance responses so as to produce a substantially corrected sheet property response.

23. Radiant energy apparatus for determining a property of a material that is normally inspected while located generally in a predetermined spatial relation to a first reference position, comprising means for defining a second reference position, sensor means responsive to a condition of the material for producing a sensor response that can be related to the material property, the relation of the sensor response to the property being susceptible to change with changes in the distance relationship of the sensor means and one of the reference positions or the material, means for producing a distance response to changes in the distance from the sensor means to at least one of the reference positions, means for producing an initial sensor and distance response-related value or values that can be derived by utilizing the first and second reference positions, and means responsive to the distance response, the initial value or values, and the sensor response for producing a material property response with substantially decreased susceptibility to change with the changes in the distance relationship of the sensor means and the reference position or the material.

24. Apparatus as in claim 23 wherein the material is in the form of a sheet that travels generally along a nominal sheet path, comprising means for supporting and guiding the sensor means generally along at least one nominal sensor path transverse to the sheet path so as to permit sensing the sheet condition at a plurality of locations spaced across the width of the sheet, the actual path or paths of the sensor means being subject to deviations from the nominal path that may result in changes in the distance from the sensor means to the one reference position or the material, and wherein the means defining the second reference position defines a reference path that is relatively independent of at least one factor that tends to produce a deviation of the actual path or paths of the sensor means.

25. Apparatus as in claim 23 comprising means for producing a stored record derived from the sensor response and the distance response when the material is absent from its normal inspection location, and means responsive to the stored record for producing the initial sensor and distance response-related value.

26. Apparatus as in claim 24 comprising means for producing a stored record derived from the sensor response and the distance response when the material is absent from its normal inspection location, means responsive to the location of the sensor means along its path across the width of the sheet for relating the values in the stored record to the sensor means location, and means responsive to the sensor location-related stored-record values for producing the initial sensor and distance response-related value, whereby the material property response is produced in response to initial values, and sensor and distance response values, from corresponding locations across the width of the sheet.

27. Apparatus as in any one of claims 23, 24, 25 or 26, wherein the sensor means comprises means responsive to the distance from the sensor means to one surface of the material, and wherein the material property response comprises a response to the thickness of the material.

28. Apparatus as in any one of claims 23, 24, 25 or 26, wherein the sensor produces an uncorrected response that can be related to the material property, but in a manner which is subject to error due to changes in the distance from the sensor means to the one reference position or the material, and wherein the means for producing the material property response systematically relates the uncorrected response to the distance response so as to produce a substantially corrected material property response.

29. Apparatus as in claim 24, wherein the sensor means comprises a first and a second distance sensor, wherein the sensor supporting and guiding means comprises means for supporting and guiding the first distance sensor along a first nominal sensor path on one side of the sheet path to produce a first sensor response to the distance from the first distance sensor to the surface of the sheet on the one side thereof, and means for supporting and guiding the second distance sensor along a second nominal sensor path on the other side of the sheet path to produce a second sensor response to the distance from the second distance sensor to the surface of the sheet on the other side thereof, said apparatus also comprising means for defining the first reference position on one side of the nominal sheet path as a reference path that is relatively independent of at least one factor that tends to produce a deviation of the actual path of one of the distance sensors, wherein the means for defining the second reference position defines such position on the other side of the nominal sheet path, wherein the means for producing the distance response comprises means for producing a first distance response to the distance from the first distance sensor to the first reference position, and means for producing a second distance response to the distance from the second distance sensor to the second reference position, and wherein the means for producing the material property response comprises means responsive to the initial value or values, the first and second sensor responses and the first and second distance responses to produce a response to the thickness of the sheet.

30. Apparatus as in claim 24 wherein the sensor means comprises a first and a second sensor means, wherein the sensor supporting and guiding means comprises means for supporting and guiding the first sensor means along a first nominal sensor path on one side of the nominal sheet path, and means for supporting and guiding the second sensor means along a second nominal sensor path on the other side of the nominal sheet path, the sensor means producing an uncorrected response that can be related to the material property but which is subject to error due to changes in the distance from the first, the second, or both sensor means from either or both of the first and second reference positions or the material, said apparatus also comprising means for defining the first reference position on one side of the nominal sheet path as a reference path that is relatively independent of at least on factor that tends to produce a deviation of the actual path of the sensor means, wherein the means for defining the second reference position defines such position on the other side of the nominal sheet path, wherein the means for producing the distance response comprises means for producing a first distance response to the distance from the first sensor means to the first reference position, and means for producing a second distance response to the distance from the second sensor means to the second reference position, and wherein the means for producing the material property response comprises means responsive to the initial value or values, the uncorrected sensor response, and the first and second distance responses to produce a corrected sensor response to the material property.

31. Apparatus as in claim 30 wherein the first sensor means comprises a radiation source, and the second sensor means comprises a radiation detector for detecting radiation from the source that is transmitted through the sheet.

32. Apparatus as in claim 29 or claim 30, wherein the means for producing the initial sensor and distance response-related value or values comprises means operable in the absence of the sheet material in the normal inspection location for supporting a test fixture in the region of the nominal sheet path whereby the sensor means produces a sensor response to the test fixture, means for producing a stored record derived from the sensor means response to the test fixture and the first and second distance responses at a plurality of locations along the path of the sensor means, means responsive to the location of the sensor means along its path across the width of the normal inspection location of the sheet material for relating the values in the stored record to the sensor means location, and means responsive to the sensor location-related stored-record values to produce the initial sensor and distance response-related values, whereby the material property response is produced in response to initial values, and sensor and distance response-related values, from corresponding locations across the width of the sheet.

33. Apparatus as in claim 23 which comprises means for deriving both the sensor response and the distance response from a common radiation sensor array, and means for directing the distance response so that it compensates the sensor response for the changes in the distance relationship.

34. Apparatus as in claim 33 which comprises means for producing an illuminated spot on one surface of the material, means for producing an illuminated spot at one of the reference positions, means for optically projecting images of the illuminated spots onto the common sensor array in a manner such that the changes in the distance relationship produce substantially equal movements of both images in the same direction and means responsive to the distance between the images to produce a compensated sensor response.

35. Apparatus as in claim 23 wherein the means for defining the second reference position comprises a mechanical member.

36. Apparatus as in claim 35 wherein the mechanial member extends transversely across the width of the path of a traveling sheet to define a reference path that can be related to the path of the sensor when measuring the property of the material constituting the sheet.

37. Apparatus as in claim 36 wherein the mechanical member comprises a tape.

38. Apparatus as in claim 23 or claim 24 wherein the means for defining the second reference position comprises a laser beam.

39. Radiant energy apparatus for determining a property of a sheeet material that is normally inspected while traveling generally along a nominal sheet path, comprising sensor means responsive to a condition of the sheet material for producing a sensor response that can be related to the material property, the relation of the sensor response to the property being susceptible to change with changes in the distance relationship of the sensor means and the sheet material, means for supporting and guiding the sensor means generally along at least one nominal sensor path transverse to the sheet path so as to permit sensing the sheet condition at a plurality of locations spaced across the width of the sheet, the actual path or paths of the sensor means being subject to deviations from the nominal path that may result in changes in the distance from the sensor means to the sheet material and thereby adversely influence the sensor response, means defining a reference path that is relatively independent of at least one factor that tends to produce a deviation of the actual path or paths of the sensor means, means for producing a distance response to changes in the distance from the sensor means to the reference path, and means for systematically relating the sensor response to the distance response so as to produce a sheet property response with substantially decreased susceptibility to change with the changes in the distance relationship of the sensor means and the material.

40. Apparatus as in claim 39 wherein the sensor means response is an uncorrected response that can be related to the property of the sheet material but which is subject to error due to the sensor path deviations, and wherein the uncorrected response is systematically related to the distance response so as to produce a substantially corrected material property response.

41. Apparatus as in claim 39 wherein the distance response producing means comprises means responsive to the distance from the sensor means to the reference path and the distance from the sensor means to one side of the sheet.

42. Apparatus as in claim 41 for determining as property of a sheet that travels generally along a nominal sheet path but the actual path of the sheet is subject to deviations from the nominal sheet path so that the sensor means response is influenced by the individual or combined effects of the sensor path and sheet path deviations, wherein the sensor means response is an uncorrected response that can be related to the sheet property but is subject to error due to the influence of the sensor path and sheet path deviations, and, wherein the uncorrected response is systematically related to the distance response so as to produce a substantially corrected material property response.

43. Apparatus as in claim 41 for determining a property of a sheet whose other side is effectively constrained to a fixed primary reference path, wherein the distance response constitutes a substantially corrected sensor means response, and wherein the corrected sensor means response is indicative of the thickness of the sheet.

44. Apparatus as in claim 41 for determining a property of a sheet that travels generally along a nominal sheet path but the actual path of the sheet is subject to deviations from the nominal sheet path so that the sensor means response is influenced by the individual or combined effects of the sensor path and sheet path deviations, comprising means for defining a second reference path, means responsive to the distance from the sensor means to the second reference path and the distance from the sensor means to the other side of the sheet, for producing a second distance response, and wherein the second distance response is also systematically related to the sensor means response to produce the sheet property response.

45. Apparatus as in claim 44 wherein the first and second distance responses constitute a substantially corrected sensor means response, and wherein the corrected sensor means response is indicative of the thickness of the sheet.

46. Apparatus as in claim 44 wherein the sensor means response is an uncorrected response that can be related to the sheet property, but which is subject to error due to the sensor path and sheet path deviations, and wherein the uncorrected response is systematically related to the first and second distance responses so as to produce a substantially corrected sheet property response.

47. Apparatus as in claim 39 wherein the means defining the reference path comprises a mechanical member extending across the width of the sheet.

48. Apparatus as in claim 47 wherein the mechanical member comprises a tape.

49. Apparatus as in claim 39 wherein the means defining the reference path comprises a laser beam.

* * * * *